United States Patent [19]

Noda

[11] Patent Number: 4,891,662

[45] Date of Patent: Jan. 2, 1990

[54] IMAGE FORMING APPARATUS

[75] Inventor: Takashi Noda, Osaka, Japan

[73] Assignee: Minolta Camera Kabushiki Kaisha, Osaka, Japan

[21] Appl. No.: 178,016

[22] Filed: Apr. 5, 1988

[30] Foreign Application Priority Data

| | | | |
|---|---|---|---|
| Apr. 9, 1987 | [JP] | Japan | 62-87336 |
| Apr. 9, 1987 | [JP] | Japan | 62-87337 |
| Apr. 9, 1987 | [JP] | Japan | 62-87338 |
| Apr. 9, 1987 | [JP] | Japan | 62-87339 |
| Apr. 10, 1987 | [JP] | Japan | 62-89621 |
| Jan. 21, 1988 | [JP] | Japan | 63-11150 |

[51] Int. Cl.[4] .......... G03B 29/00

[52] U.S. Cl. .......... 355/29; 355/28; 355/55

[58] Field of Search .......... 355/28, 29, 13, 55

[56] References Cited

U.S. PATENT DOCUMENTS

| | | | |
|---|---|---|---|
| 3,614,220 | 10/1971 | Komori et al. . | |
| 3,639,055 | 2/1972 | Schleifenbaum | 355/29 |
| 3,672,770 | 6/1972 | Lee | 355/29 |
| 3,684,373 | 8/1972 | Berge et al. | 355/29 |
| 3,770,348 | 11/1973 | Martin . | |
| 3,865,482 | 2/1975 | Bendall et al. . | |
| 3,893,360 | 7/1975 | Yano et al. | 355/29 |
| 4,260,242 | 4/1981 | Nishikawa . | |
| 4,445,682 | 5/1984 | Uchida . | |
| 4,451,136 | 5/1984 | Tanioka et al. . | |
| 4,465,271 | 8/1984 | Saitoh et al. . | |
| 4,501,490 | 2/1985 | Miyamoto et al. | 355/55 |
| 4,616,925 | 10/1986 | Saijo et al. | 355/29 |
| 4,647,188 | 3/1987 | Komiya et al. . | |

*Primary Examiner*—Monroe H. Hayes
*Attorney, Agent, or Firm*—Burns, Doane, Swecker & Mathis

[57] ABSTRACT

An image forming apparatus which comprises a paper feeding device capable of feeding roll papers including a plurality of widths and a cutter for cutting them in fixed sizes, and discriminates to perform either of the lateral cutting of said roll paper with the direction of width taken as a long side or the longitudinal cutting thereof with the direction of width taken as a short side, by the width of the roll paper and an image signal designating the image length determined by the document length in the feeding direction and the specified copy magnification, and can automatically perform fixed-sized longitudinal cutting or lateral cutting of the roll paper on the basis of the result of that discrimination.

9 Claims, 22 Drawing Sheets

48
PS7
47
50
60
57a
M3
PS11
53b
PS10
54b
55b
56b
51
57
65
54
62
61
64
63
56
66
27
55
53
54a
52
56a
PS9
52a
53a
23
PS8
26
21
22
24
31
25
55a
20
M2
SW1~SW3
1
45
46
5
4
3
30
2
10
35
37
6
43
34
PS3
PS6
PS1
41
39
PS2
36
PS4
PS5
7
8
9
42
44
38
40
SW4~SW6
M1
32
33

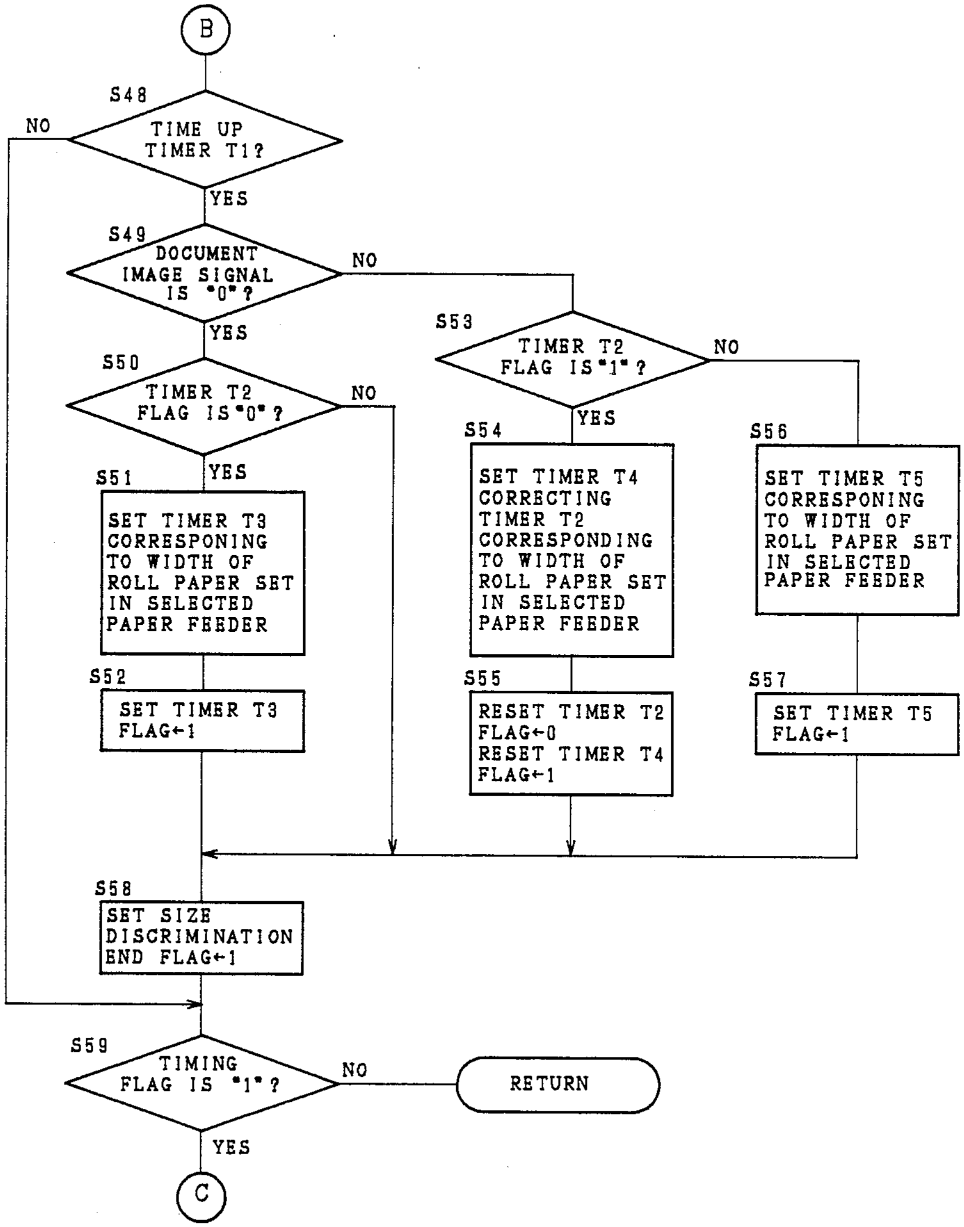
B
S48
TIME UP TIMER T1?
NO
YES
S49
DOCUMENT IMAGE SIGNAL IS "0"?
NO
YES
S50
TIMER T2 FLAG IS "0"?
NO
YES
S51
SET TIMER T3 CORRESPONING TO WIDTH OF ROLL PAPER SET IN SELECTED PAPER FEEDER
S52
SET TIMER T3 FLAG←1
S53
TIMER T2 FLAG IS "1"?
NO
YES
S54
SET TIMER T4 CORRECTING TIMER T2 CORRESPONDING TO WIDTH OF ROLL PAPER SET IN SELECTED PAPER FEEDER
S55
RESET TIMER T2 FLAG←0 RESET TIMER T4 FLAG←1
S56
SET TIMER T5 CORRESPONING TO WIDTH OF ROLL PAPER SET IN SELECTED PAPER FEEDER
S57
SET TIMER T5 FLAG←1
S58
SET SIZE DISCRIMINATION END FLAG←1
S59
TIMING FLAG IS "1"?
NO
RETURN
YES
C

IMAGE FORMING APPARATUS

BACKGROUND OF THE INVENTION

1. Field of the Invention

The present invention relates to an image forming apparatus such as a copying machine or a printer, and more particularly to an image forming apparatus having a controlling mechanism cutting a roll paper whereon an image is formed.

2. Description of the Prior Art

Generally, in copying machines wherein an image of a document is formed on a roll paper loaded in a paper feeder, the fixed-size cutting system is adopted which is convenient for handling because of the same size of the cut papers. Then, the roll paper can be cut in two kinds of fixed sizes by the lateral cutting with the direction of width taken as a long side and the longitudinal cutting with the direction of width taken as a short side. Which cutting is to be executed is determined on the basis of the image length determined by the length of the document and the copy magnification. Then, conventionally, as shown in the Japanese Utility Patent Publication No. 57-2992/1982, the length to be cut is determined by a combination of a switch for detecting the width of a roll paper and a switch for changing-over the size to be cut. Or, as shown in the Japanese Patent Publication No. 61-12258/1986, using the switch for detecting the width of a roll paper and a switch for selecting the copy size, when the width of the roll paper agrees with one side of the copy size, cutting córresponding to the other side is performed.

However, in either of the above-described apparatuses, an operator is required to input the size to be cut or the copy size, and in some cases a wrong input is expected. Therefore it is not preferable for convenient use.

SUMMARY OF THE INVENTION

The present invention has been achieved to solve the conventional technical problem as described above.

A first object of this invention is to provide an image forming apparatus wherein the length to be cut of a roll paper is discriminated on the basis of the image length determined by the width of a roll paper, the length of a document in the feeding direction and the copy magnification, and thereby the length to be cut in the lateral fixed size or the longitudinal fixed size.

A second object of the present invention is to provide an image forming apparatus wherein discrimination of the size to be cut of a roll paper is performed without input by the operator, and thereby a wrong input is prevented and use convenience is improved.

A third object of this invention is to provide an image forming apparatus wherein the size to be cut does not deviate in the case where a function shifting an image back and forth in the direction of feeding a roll paper is added for the purpose of providing margin for filling or the like.

A forth object of this invention is to provide an image forming apparatus wherein, when discrimination of the size to be cut cannot be made, cutting a performed in the longitudinal fixed size, and thereby a disadvantage can be prevented that the image to be cut in the longitudinal fixed size is cut in the lateral size.

The above and further objects and features of the invention will more fully be apparent from the following detailed description with accompanying drawings.

DESCRIPTION OF THE PREFERRED EMBODIMENTS

Hereinafter, description is made on one embodiment of an image forming apparatus in accordance with the present invention according to the accompanying drawings. This embodiment is constituted with a copying machine main unit 1 of toner image transfer type and a recircular automatic document feeder (hereafter described as RADF) 50 which automatically circulates a document by a copy quantity.

[Copy machine main unit]

Figure 1:
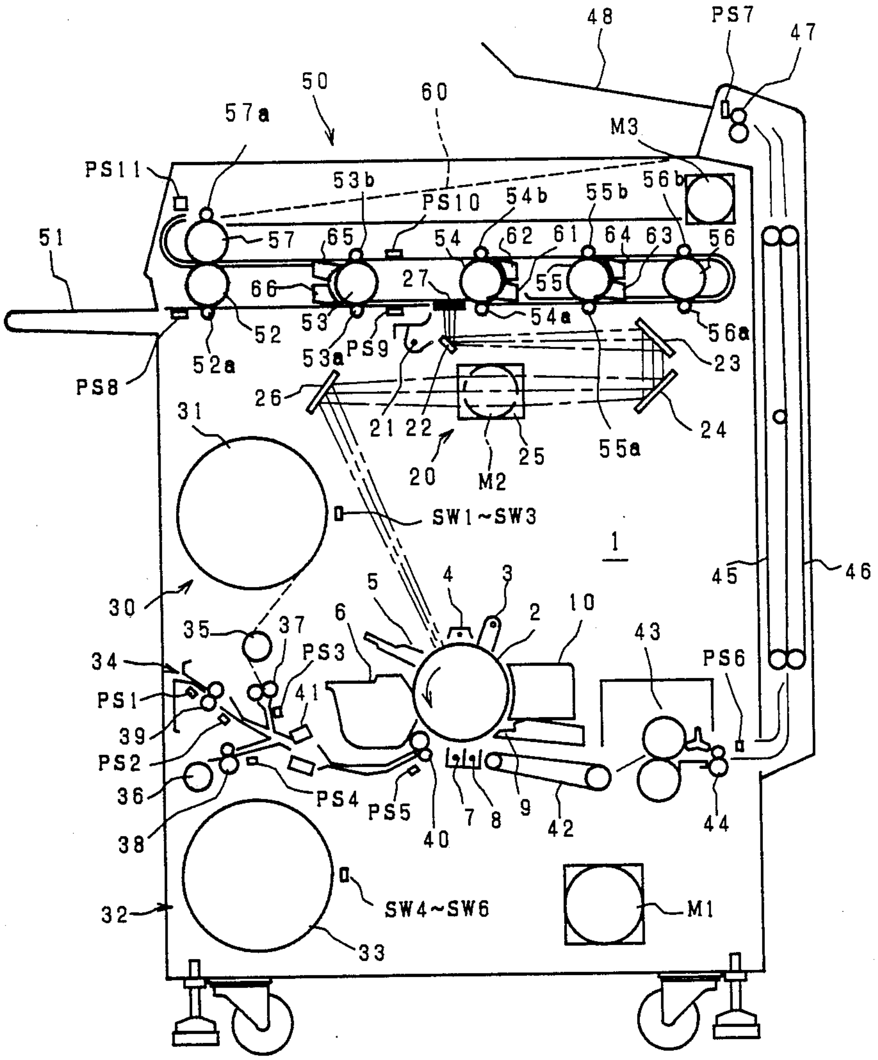
FIG. 1 is a transverse cross-sectional view showing a configuration of an image forming apparatus in accordance to the present invention.

FIG. 1 is a transverse cross-sectional view showing a configuration of an image forming apparatus in accordance with the present invention. In the copying machine main unit 1, a photosensitive drum 2 is installed in nearly the center part thereof in a manner capable of rotation-driving in the direction shown by an arrow (a), and surrounding it, a main eraser lamp 3, a charger 4, a space-between-images eraser lamp 5, a magnetic brush type developing device 6, a transferring charger 7, a paper separating charger 8, a separating click 9 and a blade type cleaning device 10 are disposed.

An optional system 20 is constituted with an exposure lamp 21, mirrors 22, 23 and 24, a lens 25 and a mirror 26, and produces an image of a document to be carried on a document slit glass 27 on the photosensitive drum 2 by the RADF 50 to be described later. The lens 25 and the mirror 26 can be moved in the direction of the optical axis by a motor M2 corresponding to the copy magnification.

On the above-mentioned photosensitive drum 2, remaining charges are erased by the main eraser lamp 3 every time of copying, and a predetermined quantity of charges are given by the charger 4, and a document image is produced by the optical system 20, and an electrostatic latent image is formed. This electrostatic latent image is made into a toner image by the developing device 6.

On the other hand, the paper feeder is constituted with an upper paper feeder 30 and a lower paper feeder 32 which can selectively load roll papers 31 and 33 and a manual paper feeder 34 for cut paper. The roll papers 31 and 33 are drawn out of a pair of paper feed rollers 37 and 38 through rollers 35 and 36, and are fed to a pair of timing rollers 40 after guided by various guide plates and put once in the ready state. Also, a cut paper inserted from the manual paper feeder 34 is fed to the timing rollers 40 by a pair of feed rollers 39 and put once in the ready state. The timing rollers 40 are rotation-driven by a predetermined timing signal, and the paper is transferred the toner image by discharge of the transferring charger 7 and separated from the photosensitive drum 2 by AC discharge of the separating charger 8 and the separating click 9. The timing signal is generated at a timing when the front end of the image formed on the photosensitive drum 2 is synchronized with the front end of the paper at a transfer part. In addition, when the image shift mode is selected and the image is shifted forward in the feeding direction, the timing of rotation of the timing rollers 40 is delayed from the timing signal by an amount of image shift. When the image is shifted backward in the feeding direction, the timing of rotation of the timing rollers 40 is advanced from the timing signal by an amount of image shift. The amount of shift is set in advance by the service man by operating an adjusting switch.

Also, the roll papers 31 and 33 are cut to the lateral fixed size being a first length or to the longitudinal fixed size being a second length by a cutter 41 on the basis of a cut signal to be detailed later. After transfer, the paper is sent to a fixing device 43 through a carrying belt 42 provided with an air suction means (not illustrated), and here fixation of toner is applied to it, and it is discharged outside the main unit 1 by a first discharging roller 44.

Furthermore, the paper is carried upward vertically by belts 45 and 46 and discharged on a copy receiving tray 48 by a second discharging roller 47.

The above-mentioned photosensitive drum 2, a paper feeding system and a paper carrying system are driven by a main motor M1.

Two sets of three microswitches SW1-SW3 and SW4-SW6 are installed in the above-mentioned upper paper feeder 30 and lower paper feeder 32, respectively. These switches are turned on and off by the roll papers and detect the width of the set roll papers 31 and 33 on the basis of 3-bit codes in response to a combination of on and off, and also detect the presence of the roll paper.

The following Table 1 shows an example of codes produced by the switches SW1-SW3 of the upper paper feeder 30. In this Table 1, turn-on of the switch is represented as "0", and turn-off is represented as "1", and turn-off of all the switches represents that no roll paper is set in the upper paper feeder 30. In addition, the switches SW4-SW6 of the lower paper feeder 32 perform similar detection.

TABLE 1

| Binary code | | | | |
|---|---|---|---|---|
| SW3 | SW2 | SW1 | Roll paper width | Decimal code |
| 0 | 0 | 0 | A2: 410 mm in width | 0 |
| 0 | 0 | 1 | A3: 297 mm in width | 1 |
| 0 | 1 | 1 | A4: 210 mm in width | 3 |
| 1 | 1 | 1 | Roll paper is not set | 7 |

Also, various sensors are installed in the copying machine main unit 1. Sensors PS1 and PS2 are for detecting a cut paper inserted into the manual paper feeder 34. Sensors PS3 and PS4 are for detecting the roll papers 31 and 33 loaded in the upper and lower paper feeders 30 and 32. A sensor PS5 and sensors PS6 and PS7 detect arrival and passing of a paper immediately before the timing rollers 40 and immediately after the discharting rollers 44 and 47, respectively. Also, these sensors are used for detecting paper jamming and further controlling operation of the copying machine main unit 1.

[RADF]

In FIG. 1, the RADF 50 is constituted with a document table 51, document feed rollers 52–57, a copy receiving tray 60 and a document feed motor M3.

The feed rollers 52–57 are provided with driven rollers 52*a*, 53*a*, and 53*b*–57*a* respectively, and surrounding them, guide members for feeding a document are disposed properly. Also, the feed rollers 54 and 55 are provided with changeover click 61 and 63 and guide plates 62 and 64 for changing-over the circulation feed path and the feed roller 53 is provided with a change-over click 65 and a guide plate 66 for changing-over circulation and discharge of the document.

This means that in the state that the change-over click 65 is advanced into the feed path, when the change-over click 61 is also advanced therein, the document is fed in a circulated fashion between the feed rollers 53 and 54, and when the change-over click 3 is advanced therein, it is fed in a circulated fashion between the feed roller 53 and 55, and when both of the change-over clicks 61 and 63 retreat, it is fed in a circulated fashion between the feed rollers 53 and 56. On the other hand, when the above-mentioned change-over click 65 retreats from the feed path, the document is discharged from the feed roller 57 onto the copy receiving tray 60.

The above-described respective feed rollers 52–57 are rotation-driven by a document feed motor M3. When the feeding speed at equi-magnification is taken as V, the feeding speed is controlled to be V/n for the copy magnification n. The feeding speed V at equi-magnification is equal to the peripheral speed of the above-mentioned photosensitive drum 2 and the paper feeding speed.

Also, respective sensors PS8-PS11 are installed in the document feed path. The sensor PS8 detects the inserted document, the sensor PS9 detects the document immediately before the position of light irradiation by means of the exposure lamp 21 of the above-mentioned optical system 20, the sensor PS10 detects the document at a circulation/discharge change-over part, and the sensor PS11 detects the discharged document.

Next, summary description is made on the operation thereof. When the front end of the document inserted from the document table 51 is detected by the sensor PS8, the respective feed rollers 52–57 are rotation-driven by the motor M3 at a peripheral speed corresponding to the copy magnification selected in advance. Here, the document is fed into the inside of the RADF50, and passes through on the glass 27, and thereby undergoes light irradiation of the exposure lamp 21, and the light reflected here produces an image on the above-mentioned photosensitive drum 2. Simultaneously, the length of the document is detected by a combination of various sensors and timers, and the change-over clicks 61, 63 are operated in response to the document length, and the document passes through the shortest circulating feed path. When the front end of the document is detected by the sensor PS10, discrimination is made on whether or not copying has been completed, and if the circulation equivalent to the copy quality is not yet completed, the change-over click 65 is operated and the document is circulated by the feed roller 53. When the circulation equivalent to the copy quantity is completed, the document is discharged intact onto the copy receiving tray 60 through the feed roller 57, and when the rear end thereof is detected by the sensor PS11, the motor M3 is stopped.

[Operation panel]

Figure 2:
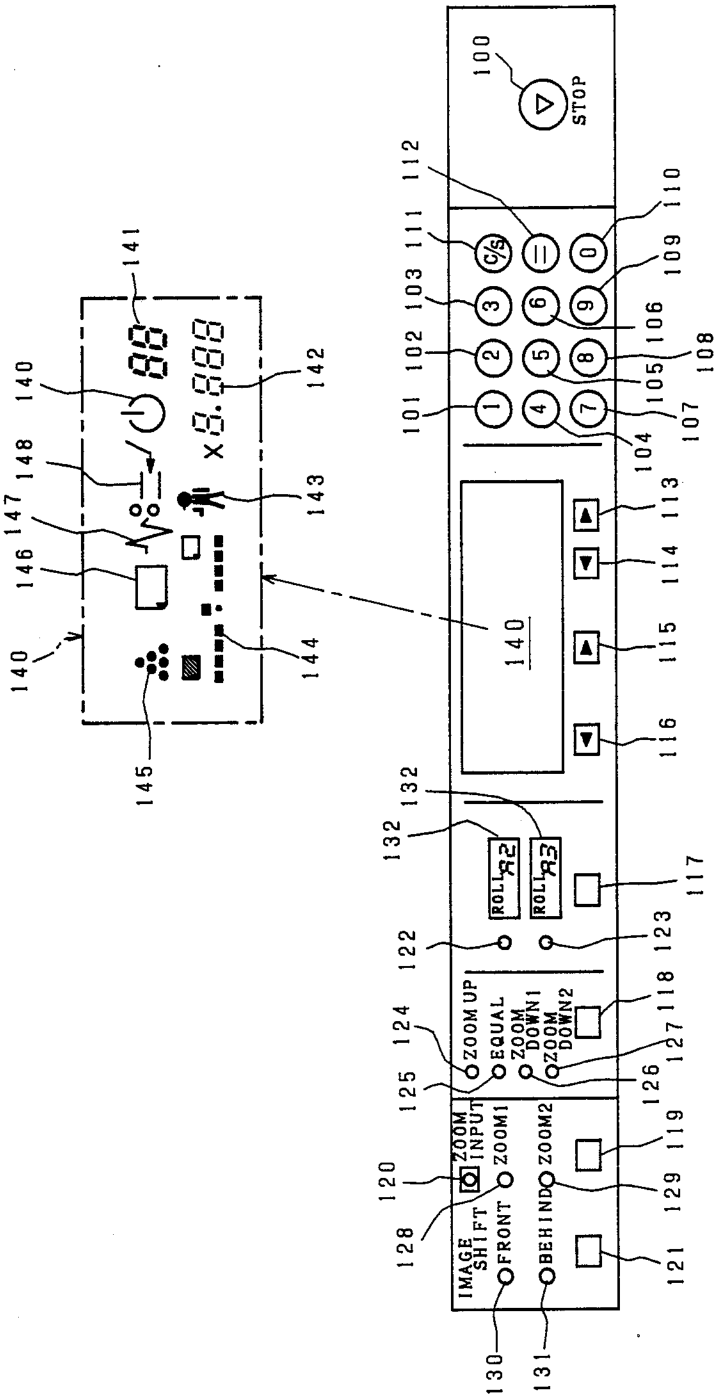
FIG. 2 is a plan view of an operation panel of the image forming apparatus.

FIG. 2 is a plan view of an operation panel. Keys, displaying means and the like to be described later are installed on the operation panel. Various keys are provided switches in the inside thereof, and by depressing, the switch is turned on.

Numeral 100 designates a stop key for stopping document feed operation of the RADF 50.

Numerals 101–110 designate ten-keys for setting the copy quantity and the like. Numeral 11 designates a clear/ stop key having the role of a stop key for releasing multicopy halfway and the role of clearing the number. Numeral 112 designates an interrupt key for executing interrupting copy. Numerals 113 and 114 designate a high magnification key and a low magnification key which increase and reduce the copy magnification on a step basis, respectively. Numerals 115 and 116 designate an exposure-up key and an exposure-down key which increase and decrease the amount of exposure on a step basis, respectively. Numeral 117 designates a select key of the upper paper feeder 30 or the lower paper feeder 32. Numeral 118 designates a copy magnification select key for selecting preset magnification of magnifying, equi-magnification and two steps of reductions. Numeral 119 designates a zoom magnification select key for selecting two kinds of zoom magnifications arbitrarily preset in advance by the user. Numeral 120 designates a zoom magnification input key for inputting the zoom magnification. Numeral 121 designates an image shift specifying key for shifting the image of the document back and forth in the feeding direction and transferring it on the roll paper.

The operation panel is further provided with a display part 140 providing displaying LEDs and fluorescent display tubes.

Numerals 122 and 123 designate LEDs displaying that the roll papers loaded in the upper paper feeder 30 and the lower paper feeder 32 have been selected respectively, which make rotation every time the above-mentioned paper feeder select key 117 is operated to ON.

Numerals 132 and 133 designate a roll paper width display part, which display on the basis of signals from the above-mentioned switches SW1–SW6 installed in the respective paper feeders 30 and 32. Numerals 124–127 designate copy magnification select displaying LEDs, which make rotation every time the above-mentioned copy magnification select key 118 is operated to ON. Numerals 128 and 129 designate zoom magnification select displaying LEDs, which make rotation every time the above-mentioned zoom magnification select key 119 is operated to ON. Numerals 130 and 131 designate LEDs displaying selection of forward image shifting and backward image shifting respectively, which make rotation every time the above-mentioned image shift specifying key 121 is operated to ON.

In the display part 140 providing fluorescent, numeral 141 designates two-digit display segments displaying the copy quantity or the like. Numeral 142 designates four-digit display segments displaying the selected copy magnification. Numeral 143 designates a picture display indicating a service man call. Numeral 144 designates a stepped display of the amount of exposure. Numeral 145 designates a toner empty display. Numeral 146 designates a roll paper empty display. Numeral 147 designates a paper jam warning display. Numeral 148 designates an interrupting copy display.

Numeral 149 designates a wait display during temperature adjustment, movement of the lens 25 or the like.

[Control circuit]

Figure 3A:
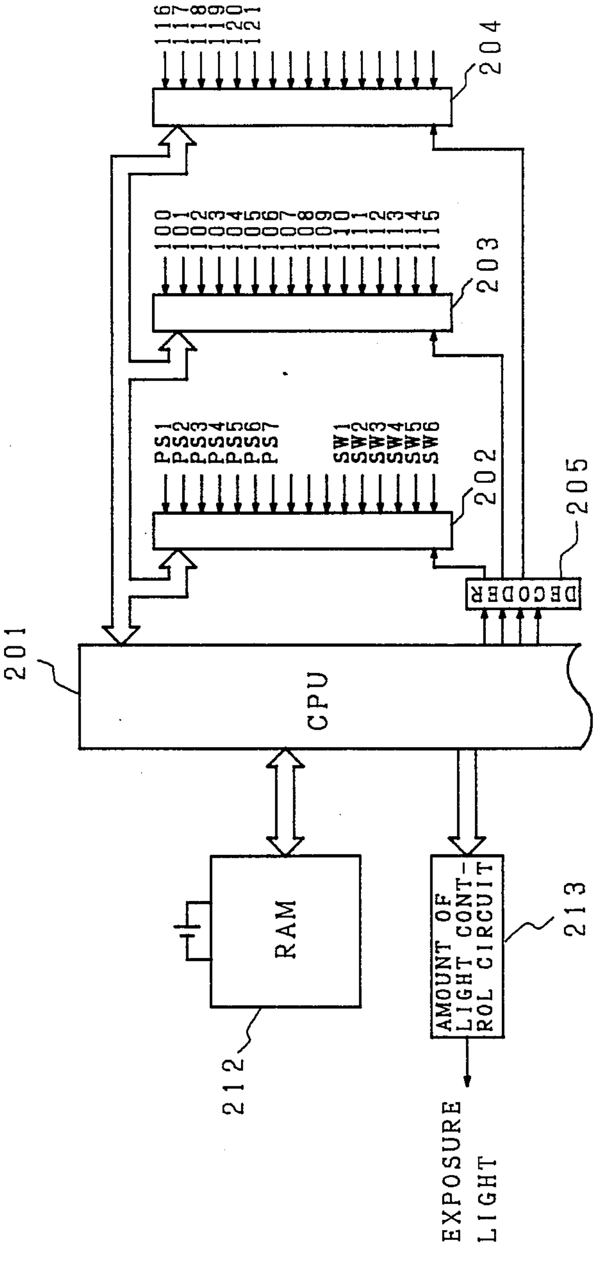
FIG. 3 is a block diagram showing an input/output configuration of two CPU of the image forming apparatus.
Figure 3B:
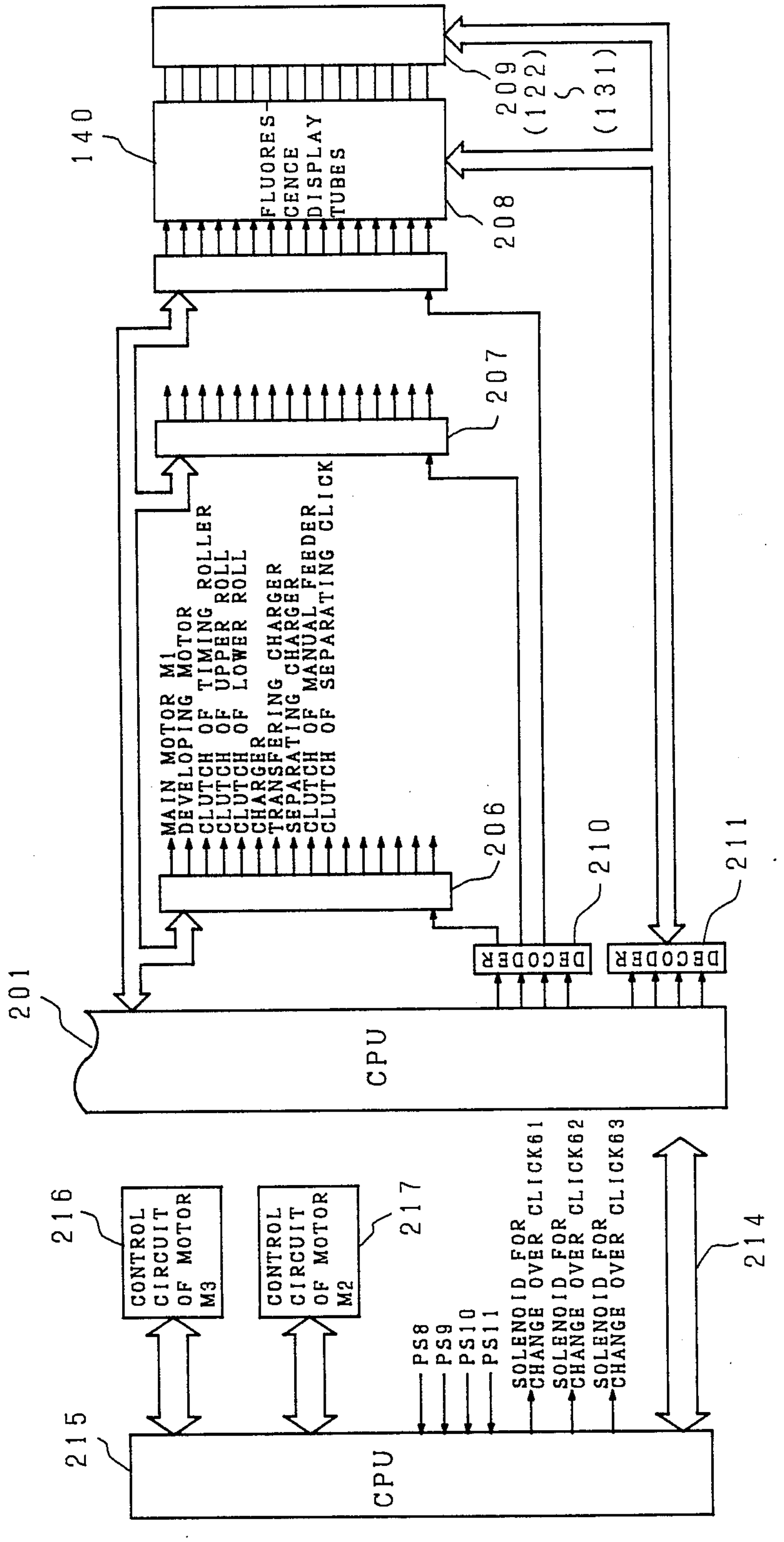

FIG. 3*a* and FIG. 3*b* are a block diagram showing an input/output configuration of a micro processor (hereafter described as CPU) 201 controlling the copying machine main unit 1, and a CPU 215 controlling the optical system 20 and the RADF 50.

The CPU 201 is provided with integrated circuits (hereafter described as IC) for input/output extension 202–204 and 206–208. The ICs 202–204 are used as ICs for input, and linked to the CPU 201 by data lines through a decoder 205. Various keys, switches, sensors and the like are connected to the input terminals. The ICs 206–208 are used as ICs for output, and the control ports thereof are connected to the CPU 201 through a decoder 210.

To the output terminals, the display part 140 providing fluorescent display tubes and an LED matrix 209 consisting of the LEDs 122–131 are connected in addition to various components, and they are controlled by the CPU 201 through a decoder 211. A random access memory (hereafter described as RAM) 212 is connected to the CPU 201 which is given memory back-up by batteries.

Also, the CPU 201 transmits a value selected from among the nine-stepped amounts of exposure as data to a amount of light control circuit 213.

On the other hand, to input/output ports of the CPU 215 a control circuit 216 of the document feed motor M3 of the RADF 50 and a control circuit 217 of the motor M2 moving the lens 25 and the mirror 26 in response to the selected (copy) magnification are connected. Also, ON-OFF signals from the respective sensors PS8–PS11 installed in the RADF 50 are inputted, and the ON-OFF signals are outputted to solenoids driving the change-over clicks 61, 63 and 65. Furthermore, the CPU 215 is connected so as to communicate with the CPU 201 through a bus 214.

[Control procedures]

Hereinafter, detailed description is made on control procedures of this embodiment in reference to FIG. 4–FIG. 16*c*, which are flowcharts of controlling the image forming apparatus in accordance with the present invention.

In addition, before making description on the flowcharts, definition is made on terms, on-edge and off-edge to be used in the description.

On-edge: when the state of a switch, sensor, signal or the like changes from the OFF-state to the ON-state, this change in state is defined as on-edge.

Off-edge: when the state of a switch, sensor, signal or the like changes from the ON state to the OFF state, this change in state is defined as off-edge.

Figure 4:
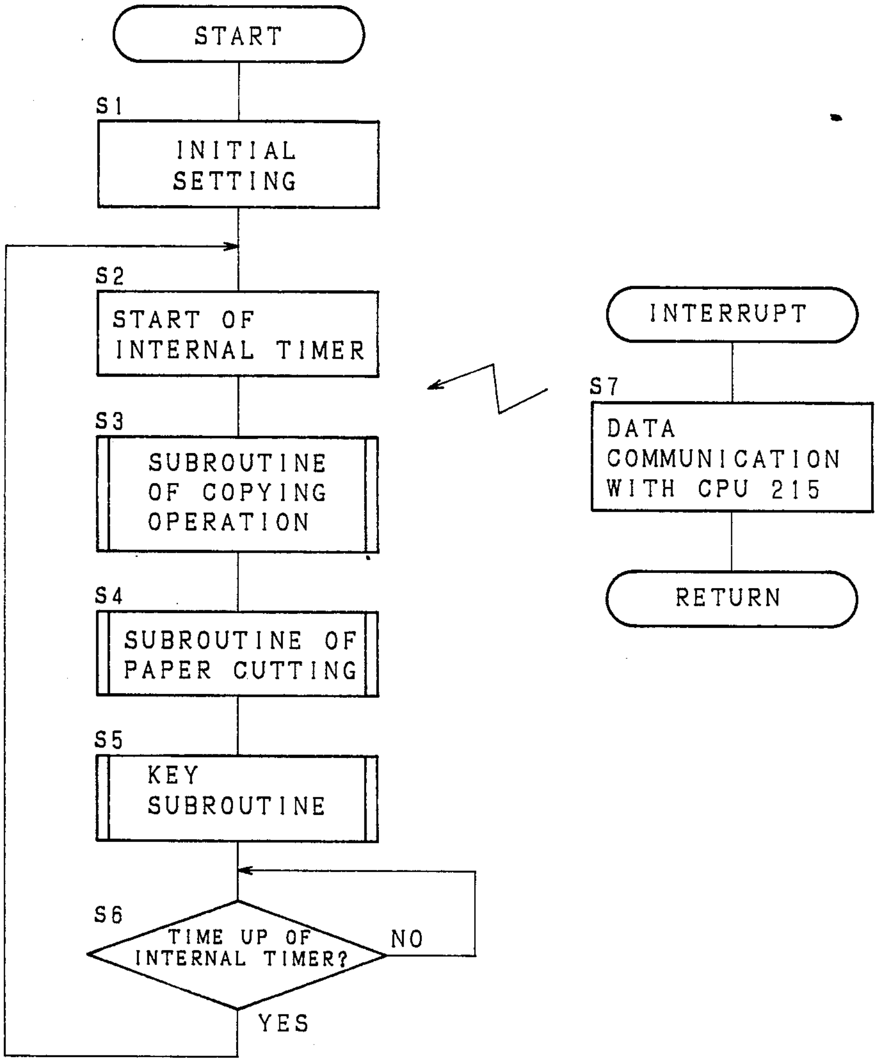
FIG. 4 through FIG. 16a and FIG. 16c are flowcharts showing control procedures of the image forming apparatus in accordance with the present invention.

FIG. 4 is a flowchart showing a main routine of the CPU 201 controlling the copying machine main unit 1.

When a rest is applied to the CPU 201 and a program is started, first, in step S1, initialization for clearing the RAM 212, initializing various registers and setting each apparatus in the initial mode are performed. Subsequently, in step S2, an internal timer of the CPU 201 is started. This internal timer determines the time required for one routine of the main routine, and the value thereof is set in advance in step S1.

Subsequently, each subroutine shown in steps S3–S5 is called in sequence, and when processing of all the subroutines are completed, in step S6, processing waits until time-up of the above-mentioned internal timer, and then returns to step S2. Using this length of the time of one routine, countings of various timers used in each subroutine are performed. This means that the values of various timers decide the end of count by the number of times of repetition of this one routine.

Also, when an interrupt request is made from the CPU 215 during execution of various processings, in step S7, data communication with the CPU 215 is performed.

Figure 5A:
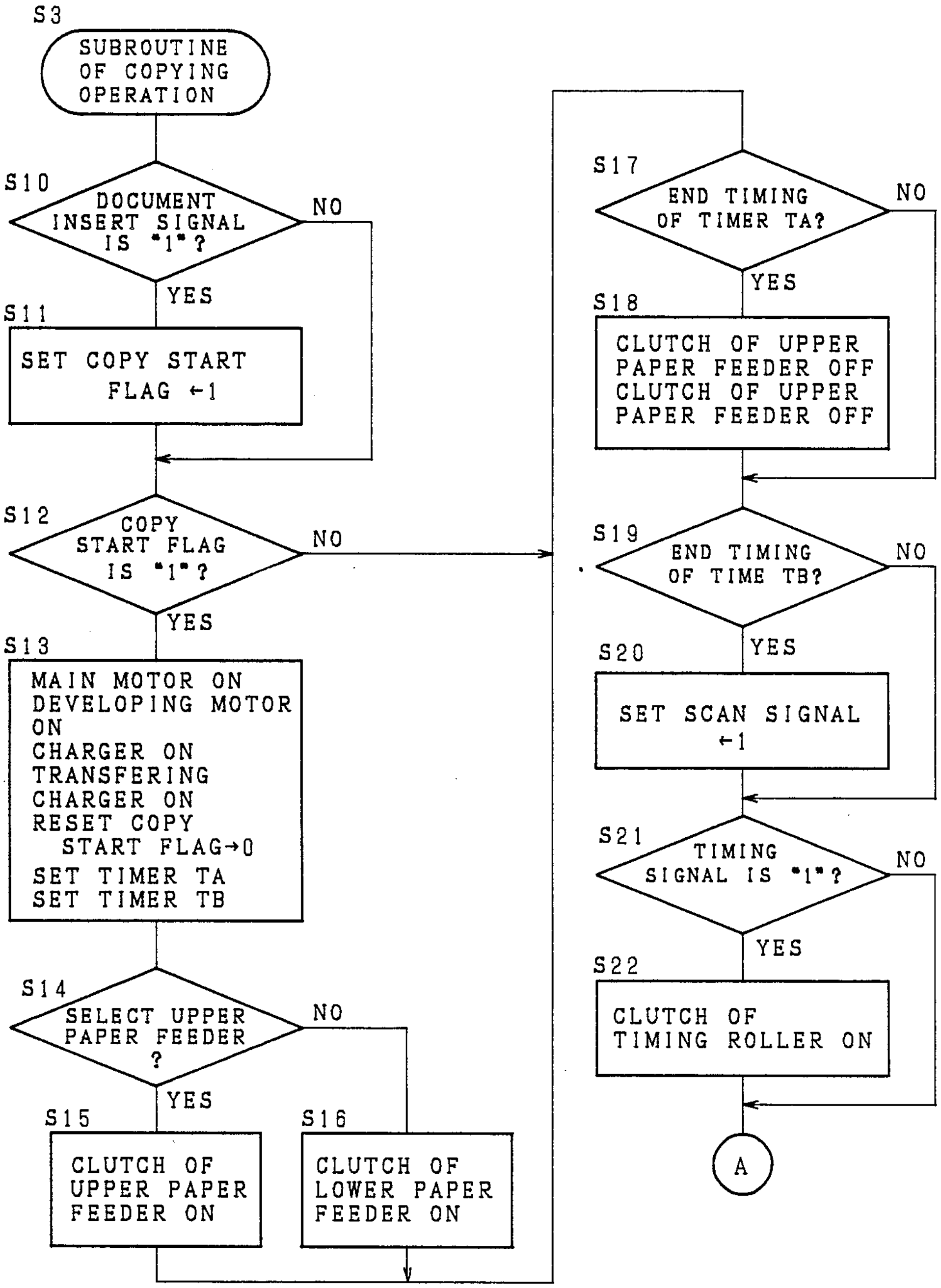
Figure 5B:
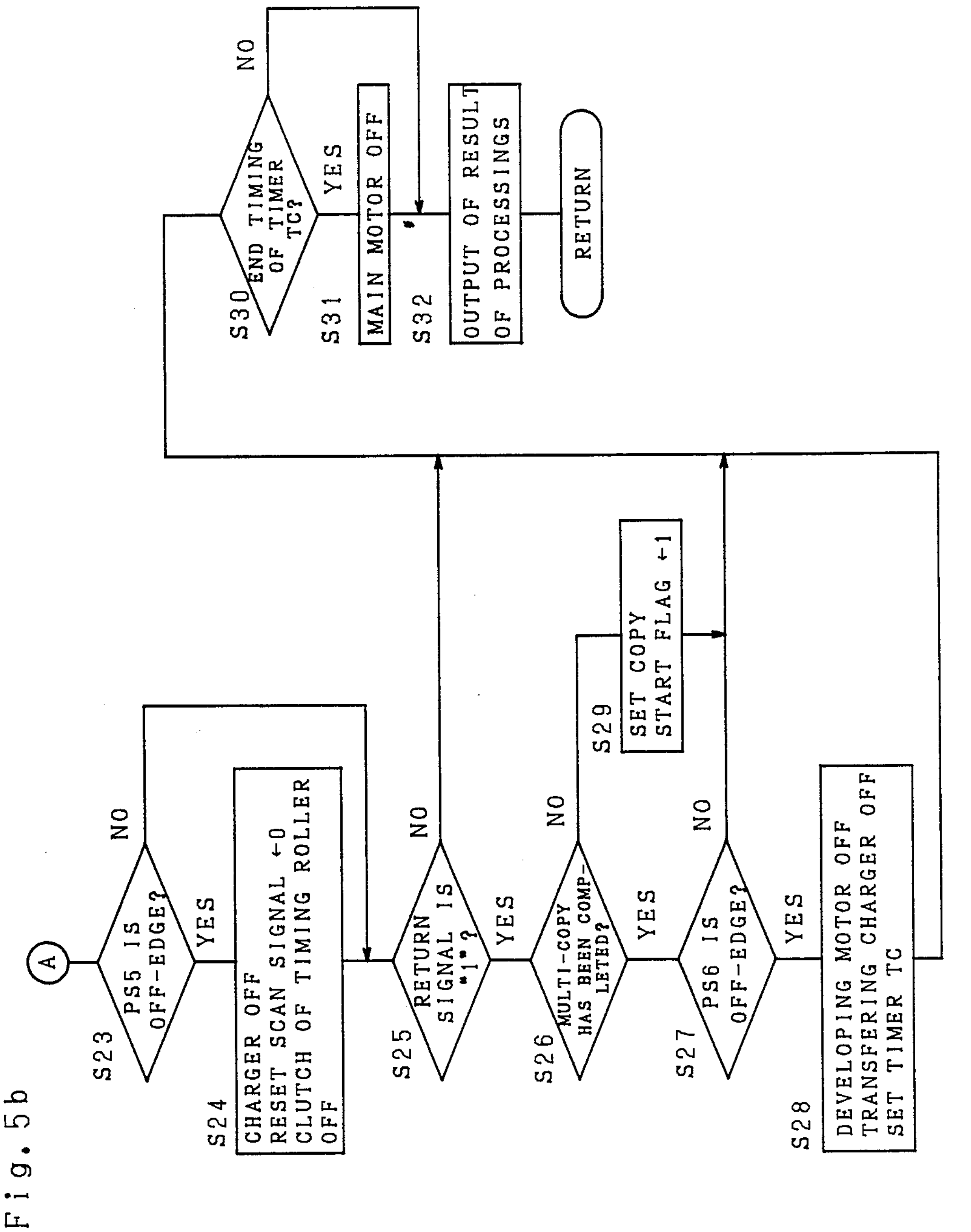
Figure 6A:
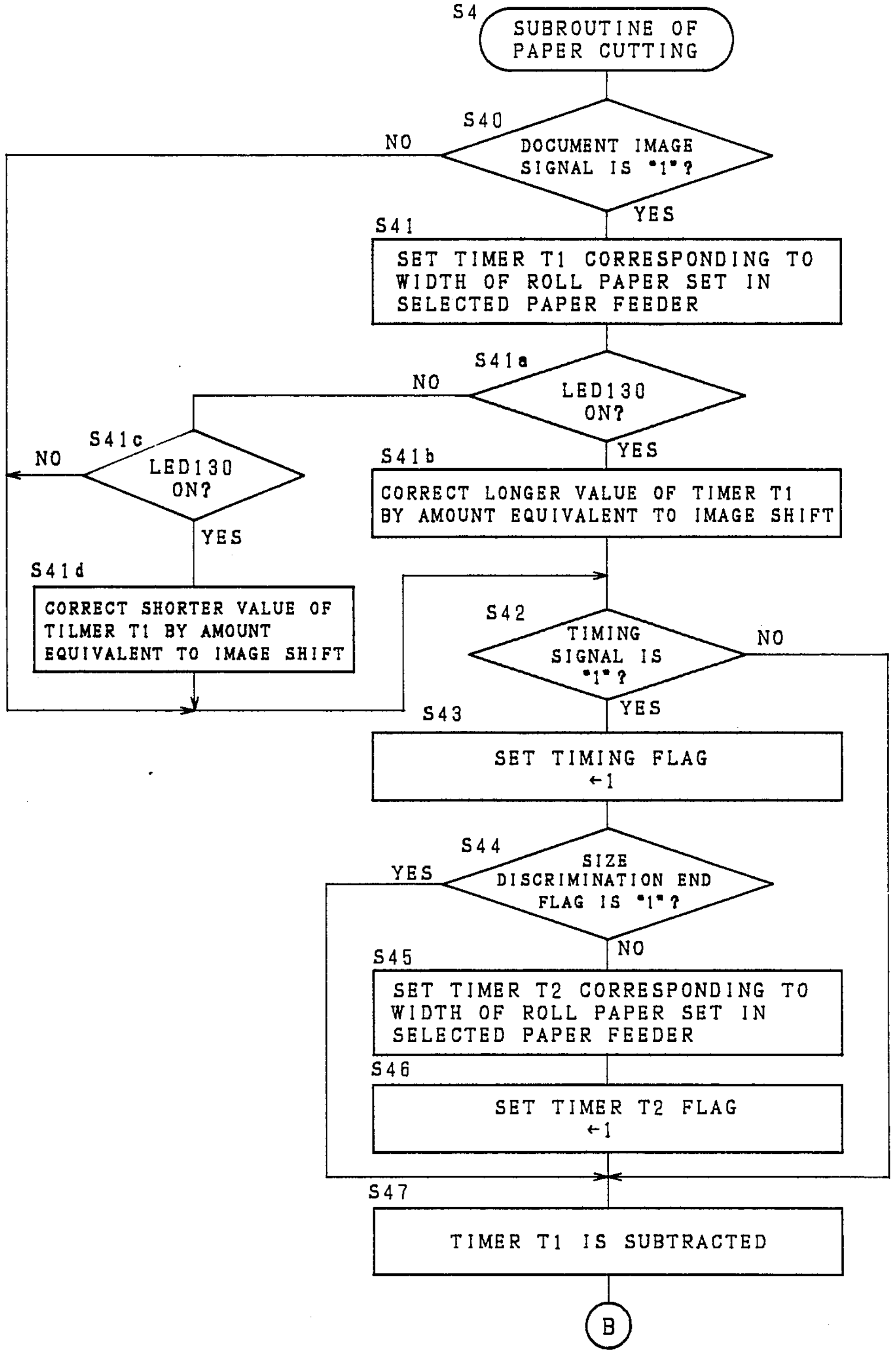
Figure 6C:
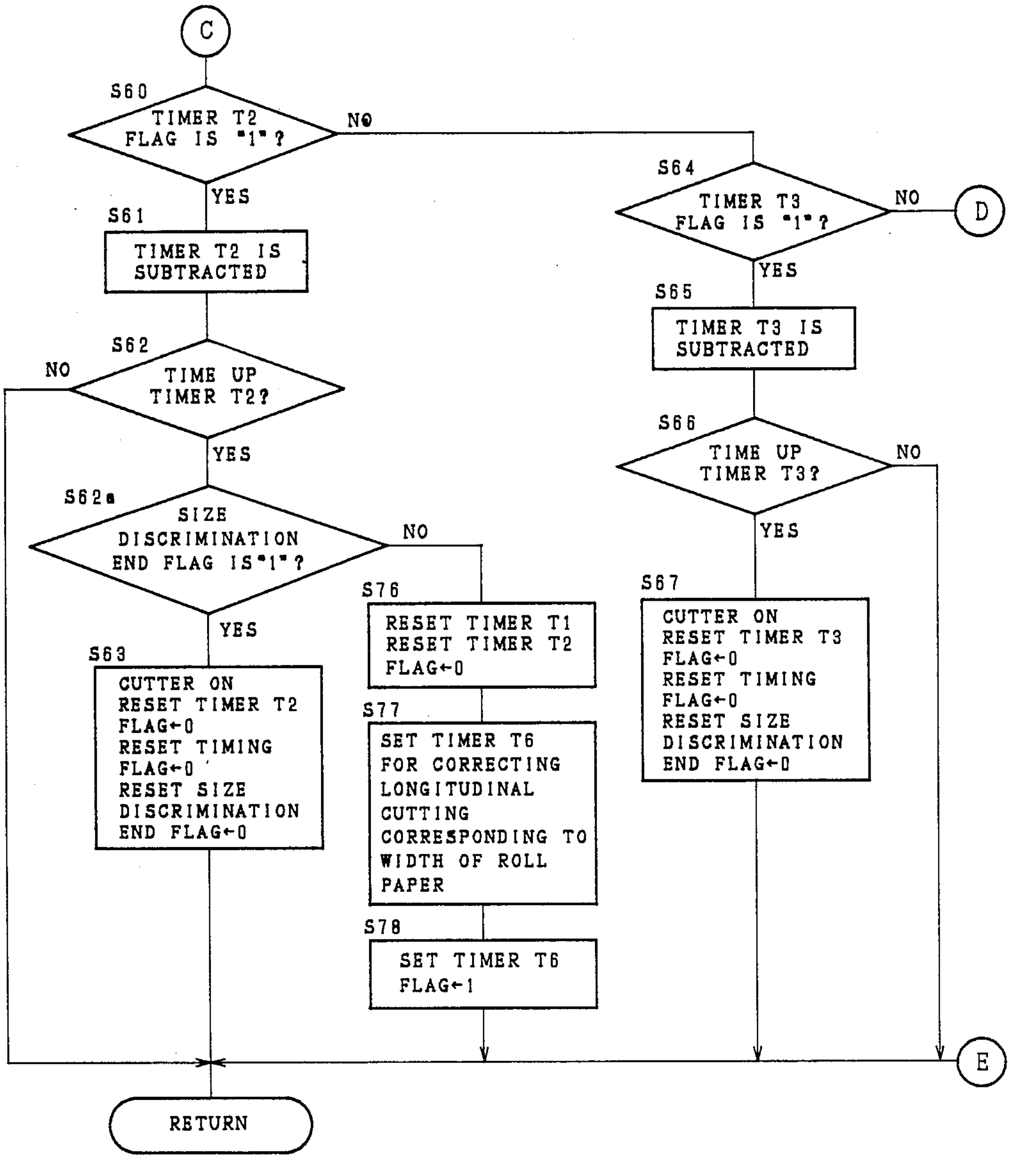
Figure 6D:
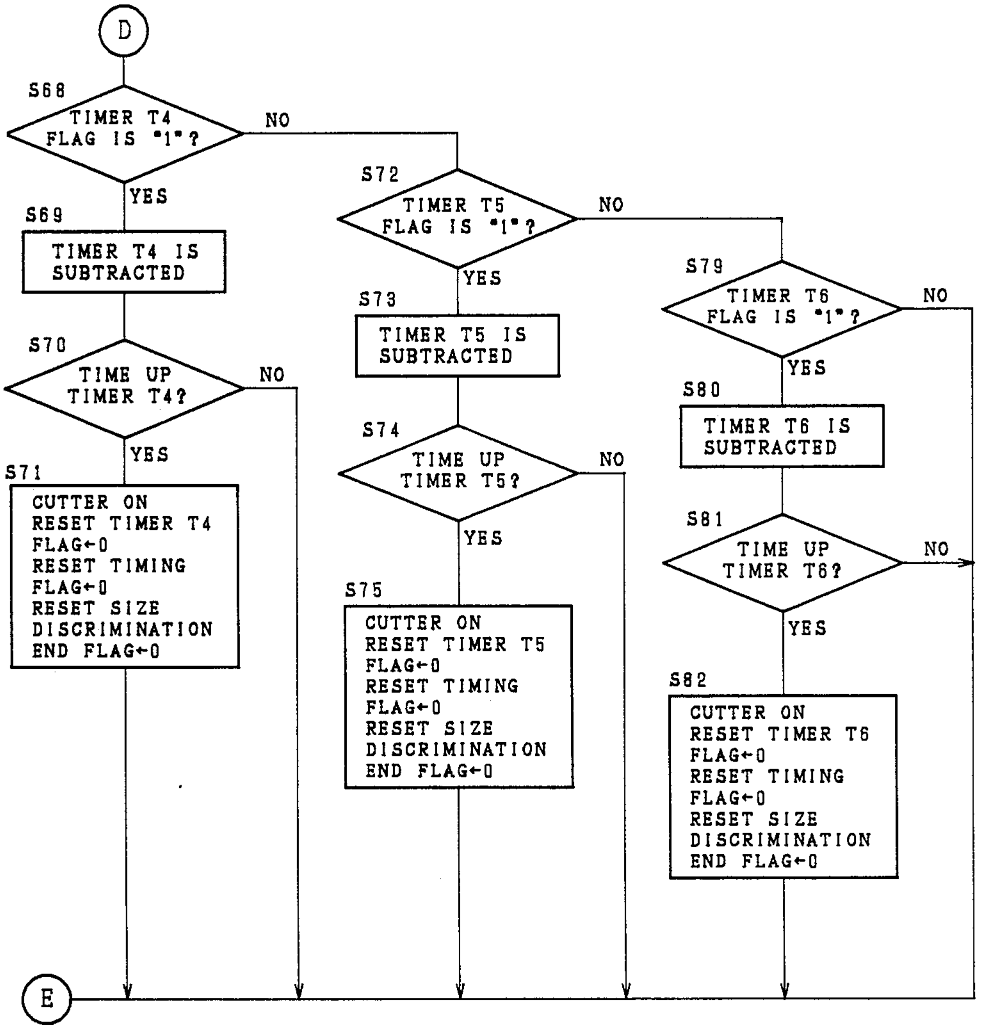

FIG. 5*a* and FIG. 5*b* show subroutines of copying operation executed in step S3 of the main routine.

First, in step S10, discrimination is made on whether or not a document insert signal is "1". The document insert signal is set to "1" when a document is inserted into the RADF 50 from the document table 51, and the front end thereof is detected by the sensor PS8 [refer to step S221]. When this setting of the document insert signal to "1" is transmitted from the CPU 215, in step S11, a copy start flag is set to "1".

Subsequently, in step S12 discrimination is made on whether or not the copy start flag is "1", and if it is set to "1", in step S13, the main motor M1, a developing motor and the like are turned on, the charger 4, the transferring charger 7 and the like are turned on, the copy start flag is reset to "0", and timers TA and TB are set. Then, in step S14, discrimination is made on whether or not the upper paper feeder 30 has been selected, and if YES, in step S15, the clutch of the upper paper feed roller 37 is turned on, and if NO, the clutch of the lower paper feed roller 38 is turned on. Thereby, either of the roll papers 31 or 33 which has been selected is fed toward the timing rollers 40.

Next, in step S17, when discriminate end timing of the timer TA is made sure, in step S18, the clutches of the paper feed rollers 37 and 38 are turned off. Also, in step S19, when discriminate end timing of the timer TB is made sure, in step S20, a scan signal is set to "1". As described in step S224 of FIG. 16*a*, the scan signal is for carrying the document from the position of the sensor PS9 toward the position of light irradiation by the exposure lamp 21.

Next, in step S21, discrimination is made on whether or not a timing signal is "1". The timing signal is for synchronizing the front end of the document image formed on the photosensitive drum 2 with the front end of the paper at the transfer position, and it is set to "1" in the following step S232. When this setting of the timing signal to "1" is transmitted from the CPU 215, in step S22, the clutch of the timing rollers 40 is turned on. Here, the roll paper begins to be fed from the timing rollers 40 to the transfer position. In addition, when the image shift mode is selected, actually the timing of turning-on the clutch of the timing rollers 40 is shifted corresponding to the amount of shift of the image.

Subsequently, in step S23, off-edge of the sensor PS5 is discriminated. When the rear end of the cut paper passes through, the sensor PS5 turns off which results in off-edge of the sensor PS5. If the off-edge of the sensor PS5 is discriminated, the charger 4 is turned off, the scan signal is reset to "0", and the clutch of the timing rollers 40 is turned off in step S24.

Next, in step S25, discrimination is made on whether or not a return signal is "1". The return signal is set to "1" when the front end of the document is detected by the sensor PS10 (refer to step 239). When the return signal is transmitted from the CPU 215, in step S26, discrimination is made on whether or not multi-copy has been completed. If not completed, in step S29, the copy start flag is set to "1", and preparation for re-starting copying operation is performed. If completed, in step S27, off-edge of the sensor PS6 is discriminated. When the rear end of the paper passes through, the sensor PS6 turns off which results in off-edge of the sensor PS6. If the off-edge is discriminated, the developing motor, the transferring charger 7 and the like are turned off, and a timer TC is set in step S28. Furthermore, in step S30, when discriminate end timing of the timer TC is made sure, in step S31, the main motor M1 is turned off, and in step S32, the results of processings up to this time are outputted, and this subroutine ends.

FIG. 6*a*, FIG. 6*b*, FIG. 6*c* and FIG. 6*d* show subroutines of paper cutting executed in step S4 of the main routine.

First, in step S40, discrimination is made on whether or not a document image signal is "1". The document image signal is set to "1" when the front end of the document inserted into the RADF 50 reaches the position of light irradiation on the glass 27 (refer to step S229). This setting of the document image signal to "1" is transmitted from the CPU 215, in step S41, a time T1 is set which corresponds to the width of the roll paper 31 or 33 set in the selected paper feeder 30 or 32. This timer T1 is set to the time required for the roll paper to be fed by an arbitrary intermediate size between the lateral fixed size and the longitudinal fixed size of the roll paper.

For example, in the case of the roll paper having a width of 297mm, the timer is set to the time required for the roll paper to be fed by 315mm which is an intermediate length between 210mm being the length of the lateral fixed size "A4" and 410mm being the length of the longitudinal fixed size "A3". Also, in the case of the roll paper having a width of 410mm, the timer is set to the time required for the roll paper to be fed by 445mm which is an intermediate length between 297mm being the length of the lateral fixed size "A3" and 594mm being the length of the longitudinal fixed size "A2".

Subsequently, in steps S41*a* and S41*c*, discrimination is made on whether or not the image shift select displaying LED 130 or 131 is turned on. If the LED 130 is turned on, the forward image shift mode is selected. In this mode, the roll paper is fed from the timing rollers 40 later than the normal mode. And therefore, in step S41*b*, the value of the above-mentioned timer T1 is corrected longer by an amount equivalent to the image shift. Also, when the LED 131 is turned on, the backward image shift mode is selected. In this mode, the roll paper is fed from the timing rollers 40 earlier than the normal mode. And therefore, in step S41*d*, the value of the above-mentioned timer T1 is corrected shorter by an amount equivalent to the image shift.

Subsequently, in step S42, discrimination is made on whether or not the timing signal is "1", that is, whether or not it is timing of turning-on the timing rollers 40 to feed the roll paper to the transfer position. If the timing signal is "0", processing precedes to step S47, and if it is set to "1", in step S43, the timing flag is set to "1". Subsequently, in step S42, discrimination is made on whether or not the timing signal is "1", that is, whether or not it is timing of turning-on the timing rollers 40 to feed the roll paper to the transfer position. If the timing signal is "0", processing precedes to step S47, and if it is set to "1", in step S43, the timing flag is set to "1". Subsequently, in step S44, discrimination is made on whether or not a size discrimination end flag is "1". When discrimination of the size of the selected roll paper is completed, the size discrimination end flag is set to "1" (refer to step S 58). If the flag is set to "1", processing proceeds to step S47, and if "0", in step S45, a timer T2 is set which corresponds to the width of the roll paper 31 or 33 set in the selected paper feeder 30 or 32. This timer T2 is set to the time for cutting the roll paper to the lateral fixed size. Then, in step S46, a timer T2 set flag is set to "1".

Next, in step S47, the timer T1 is subtracted, and in step S48, discrimination is made on whether or not counting of the timer T1 has ended. If the counting of the timer T1 has not ended, processing proceeds to step S59, and if ended, in step S49, discrimination is made on whether or not the document image signal is "0". The document image signal is reset to "0" when the rear end of the document passes through the position of light irradiation on the glass 27 (refer to step S237). This means that the document image signal has a meaning as a signal showing the image length which is determined by the length of the document in the image scanning direction and by the selected magnification, because the document is fed at a speed corresponding to the copy magnification. Here, when the rear end of the document passes through the above-mentioned position of light irradiation and resetting of the document image signal to "0" is transmitted from the CPU 215, in step S50, discrimination is made on whether or not a timer T2 set flag is "0". If the timer T2 set flag has been set to "1", in step S58, a size discrimination end flag is set to "1". Also, if the timer T2 set flag is "0", in step S51, a time T3 is set which corresponds to the width of the roll paper 31 or 33 set in the selected paper feeder 30 or 32. This timer T3 is set to the time for cutting the roll paper to the lateral fixed size.

On the other hand, when the document is still passing through the position of light irradiation and it is discriminated that the document image signal is still set to "1" in the above mentioned step S49, in step S53, discrimination is made on whether or not the timer T2 set flag is "1". If the timer T2 set flag has been set to "1", in step S54, a timer T4 is set which corrects the above-mentioned timer T2 in correspondence to the width of the roll paper 32 or 33 set in the selected paper feeder 30 or 32. This timer T4 is set so as to correct the timer T2 to the time for cutting the roll paper in the longitudinal fixed size. Then, in step S55, the timer T2 set flag is reset to "0", and a timer T4 set flag is set to "1", and in step S58, the size discrimination end flag is set to "1". On the other hand, if the timer T2 set flag is "0", in step S56, a timer T5 is set which corresponds to the width of the roll paper 31 or 33 set in the selected paper feeder 30 or 32. This timer T5 is set to the time for cutting the roll paper to the longitudinal fixed size. Then, in step S57, a timer T5 set flag is set to "1", and in step S58, the size discrimination end flag is set to "1".

This means that, in the above-described size to be cut discriminating routine, the state of the document image signal is discriminated at the end of the counting of the timer T1 (refer to steps S48 and S49), and if the document image signal has been reset to "0", discrimination is made to cut in the lateral fixed size, and if it has been set intact to "1", discrimination is made to cut in the longitudinal fixed size. Specifically, when the document image signal has been reset to "0" and at this time the timing signal has already risen to "1", the timer T2 for cutting in the lateral fixed size set in step S45 is maintained in the set state. Also, if the timing signal has not risen to "1", in step S51, the timer T3 for cutting to the lateral fixed size is set. On the other hand, when the document image signal is set intact to "1" and the timing signal has risen to "1", that is, the above mentioned timer T2 has been set, in step S54, the timer T4 is set which corrects this timer T2 to cut the roll paper to the longitudinal fixed size. Also, when the timing signal has not risen to "1", in step S56, the timer T5 for cutting in the longitudinal fixed size is set.

When the discrimination of the size to be cut is completed as described above, discrimination is made on whether or not the timing flag is "1", and if it is "1", that is, when the roll paper starts to be fed from the timing rollers 40, first, in step S60, discrimination is made on whether or not the timer T2 set flag is "1", and if it is set to "1", in step S61, the timer T2 is subtracted, and in step S62, the end of counting of the timer T2 is made sure, and then discrimination is made on whether or not the size discrimination end flags is "1". If the size discrimination has been already completed, in step S63, the cutter 41 is turned on, the timer T2 set flag is reset to "0", and the timing flag and the size discrimination end flag are reset to "0". Thus, the roll paper is cut in a predetermined lateral fixed size.

On the other hand, in the case where the size discrimination is not yet completed when counting of the timer T2 is completed (NO in step S62*a*), in step S76, the timer T1 is reset, and the timer T2 set flag is reset to "0". Subsequently, in step S77, a timer T6 for correcting the longitudinal cutting corresponding to the width of the roll paper 31 or 33 is set, and in step S78, a timer T6 set flag is set to "1".

Also, in the case where the timers T3, T4 and T5 are set, in respective steps S64, S68 and S72, discrimination in made on whether or not the respective timer set flags are "1", and the following routine wherein those flag has been set to "1" is executed. This means that the timers T3, T4 and T5 are subtracted in respective steps S65, S69 and S73, and the ends of countings of the timers T3, T4 and T5 are made sure in respective steps S66, S70 and S74, and then the cutter 41 is turned on in respective steps S67, S72 and S75, and the respective timer set flags are reset to "0", and the timing flag and the size discrimination end flag are reset to "0". Thus, the roll paper is cut to a predetermined lateral fixed size or to the longitudinal fixed size.

Furthermore, in the case where the timer T6 for correcting the longitudinal cutting has been set in the above-mentioned step S77, if it is discriminated to be that the timer T6 set flag is "1" in step S79, the timer T6 is subtracted in step S80. Then, when the end of counting of the timer T6 is made sure in step S81, in step S82, the cutter 41 is turned on, the timer T6 set flag is reset to "0", and the timing flag and the size discrimination end flag are reset to "0".

This means that in this embodiment, when countings of the timer T2 for lateral cutting and the timers T4 and T5 for longitudinal cutting are completed, cutting of the roll paper is performed by turning on the cutter 41, respectively. However, a case can take place where the size discrimination is not yet completed at the point of completion of counting of the timer T2 for lateral cutting set once due to a trouble such as poor communication between the CPU 201 and the CPU 215 [refer to steps S62 and S62*a*]. In such a case, the timer T6 for correcting the longitudinal cutting is set newly [refer to step S77], and in step S63, the cutter 41 is inhibited be to turned on. Then, the cutter 41 is turned on at the point of completion of counting of this timer T6 [refer to step S82]. Thus, a disadvantage can be prevented from taking place that the image to be cut originally in the longitudinal fixed size is cut in the lateral fixed size.

Figure 7:
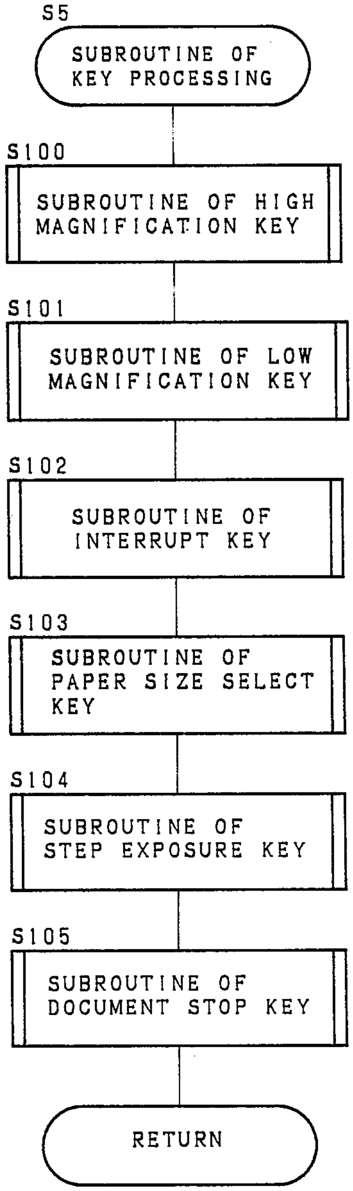

FIG. 7 shows a subroutine of key processing executed in step S5.

In this subroutine, processing of the high magnification key 113 in step S100, processing of the low magnification key 114 in step S101, processing of the interrupt key 112 in step S102, processing of the paper size select key 117 in step S 103, processing of the step exposure keys 115 and 116 in step S104 and processing of the document stop key 100 in step S105 are executed in sequence.

Figure 8:
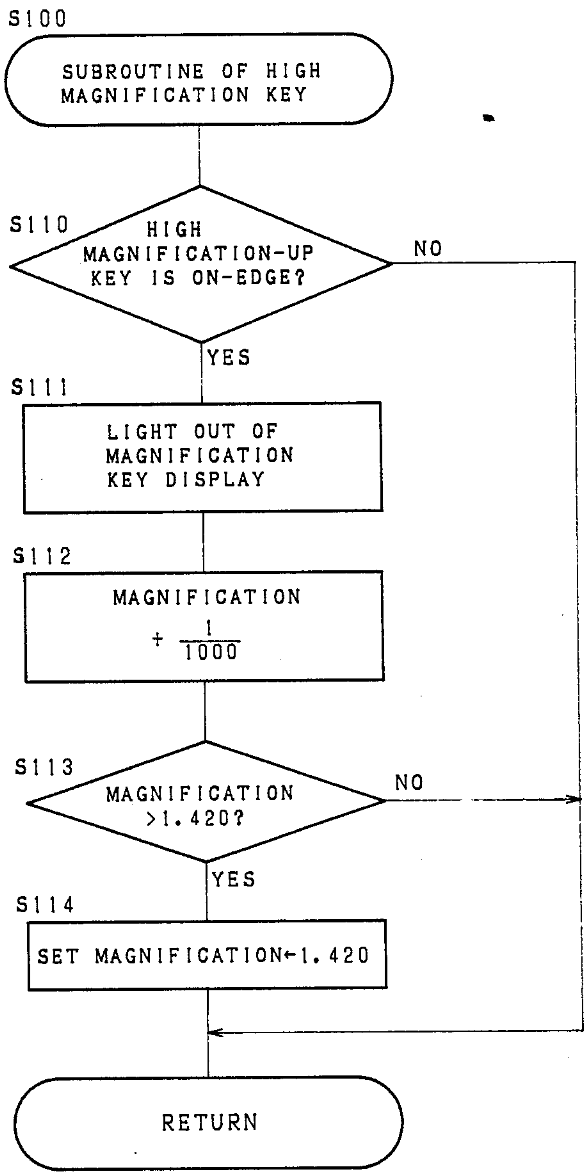

FIG. 8 shows a subroutine processing the high magnification key 113 executed in step S100.

First, when on-edge of the high magnification key 113 is made sure in step S110, the magnification key displaying LEDs 124–129 are put out in step S111, and 1/1000 is added to the magnification in step S112. This is repeated at every on-edge of the high magnification key 113, and as a result, when it is discriminated that the magnification has exceeded 1.420 being a maximum set value in step S113, the magnification is corrected to 1.420 in step S114.

Figure 9:
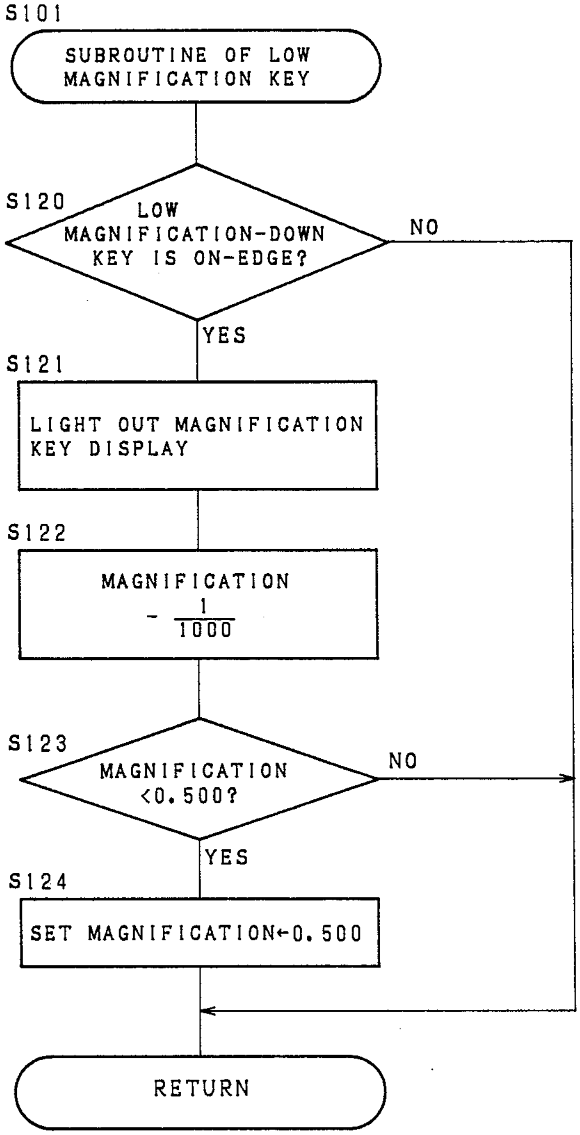

FIG. 9 shows a subroutine processing the low magnification key 114 which is executed in step S101.

First, when on-edge of the low magnification key 114 is made sure in step S120, the magnification key displaying LEDs 124–129 are put out in step S121, and 1/1000 is subtracted from the magnification in step S122. This is repeated at every on-edge of the low magnification key 114, and as a result, if it is discriminated that the magnification has decreased below 0.500 in step S123, the magnification is corrected to 0.500 in step S124.

Figure 10:
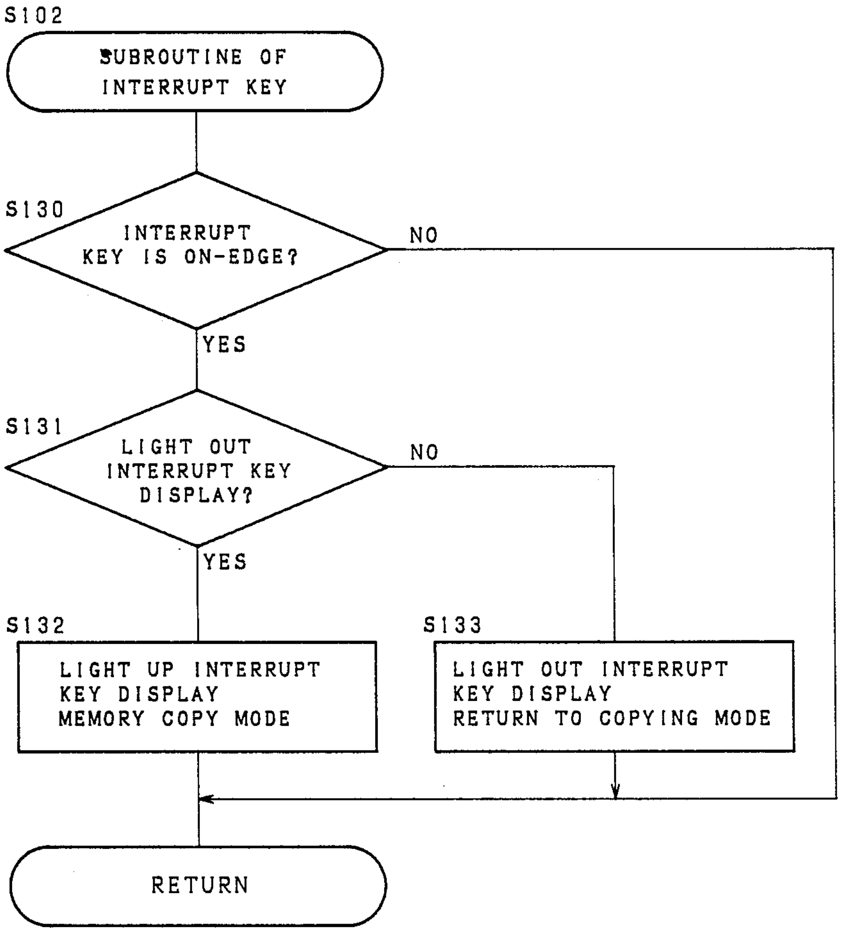

FIG. 10 shows a subroutine processing the interrupt key 112 which is executed in step S102.

First, when on-edge of the interrupt key 112 is made sure in step S130, discrimination is made on whether or not the display 148 is put out during the interrupting copy in step S131, and if the display 148 is put out, the display 148 is lit in step S132, and the copying mode at that time is stored in the RAM 212, and an interrupt is allowed. If the display 148 is lit, the display 148 is put out in step S133, and processing returns to the copying mode.

Figure 11:
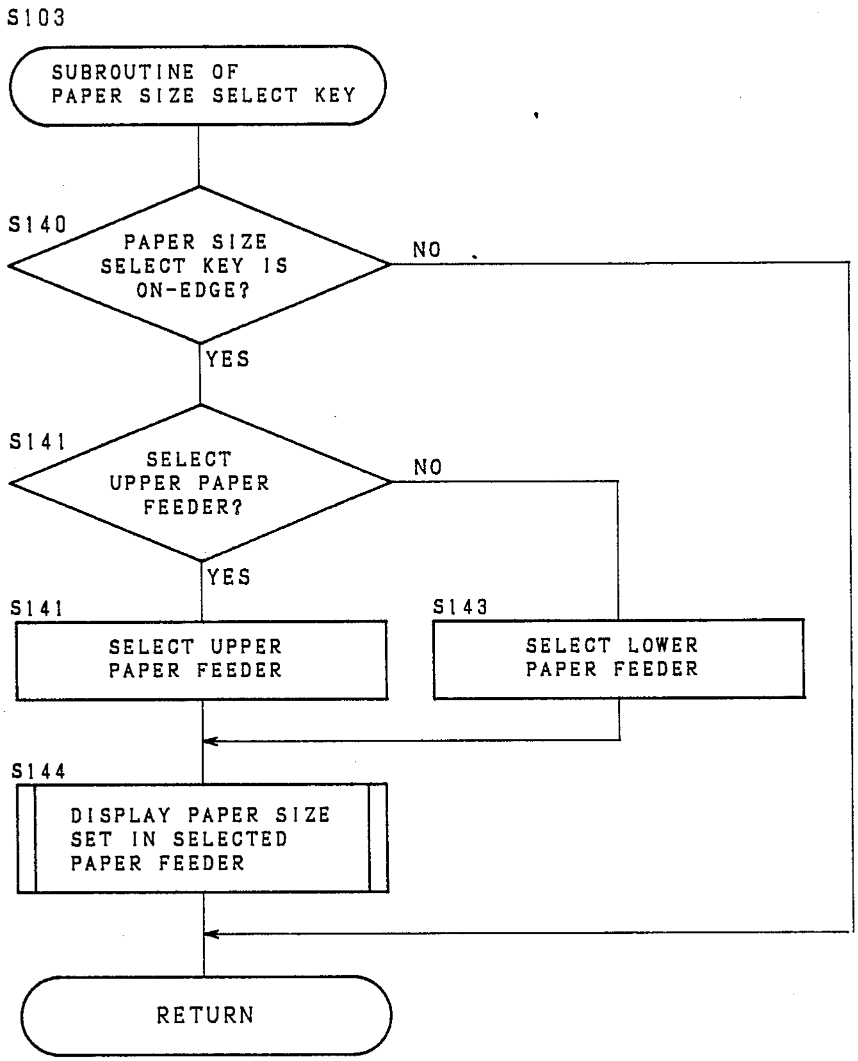

FIG. 11 shows a subroutine processing the paper size select key 117 which is executed in step S103.

First, when on-edge of the paper size select key 117 is made sure in step S140, discrimination is made on whether or not the upper paper feeder 30 has been selected in step S141. If the upper paper feeder 30 has been selected, the lower paper feeder 32 is selected in step S142. Also, if the lower paper feeder 32 has been selected, the upper paper feeder 30 is selected in step S143. Then, in step S144, the paper size set in the selected paper feeder 30 or 32 is displayed on the display part 132 or 133.

Figure 12:
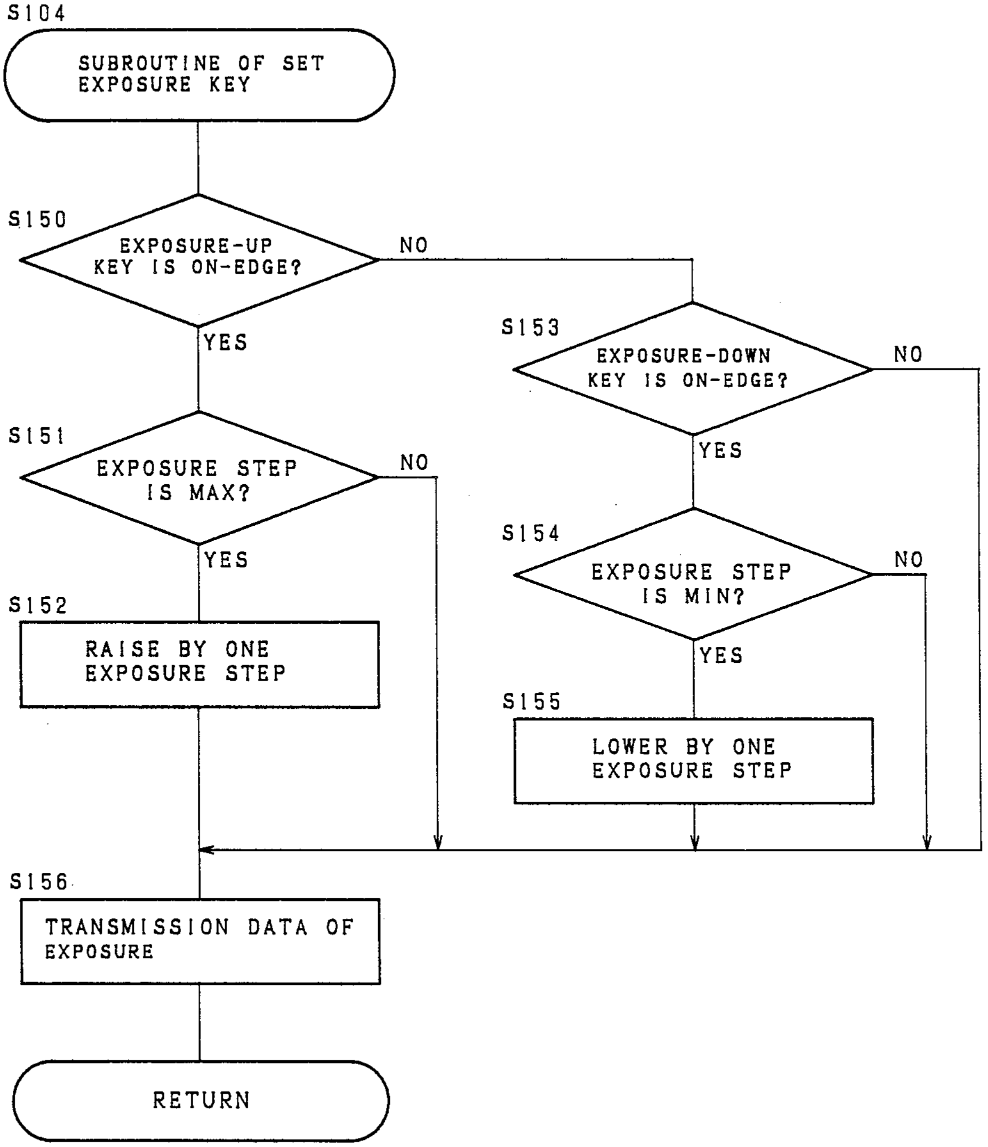

FIG. 12 shows a subroutine processing the step exposure keys 115 and 116 which are executed in step S104.

First, when on-edge of the exposure-up key 115 is made sure in step S150, in step S151, discrimination is made on whether or not the exposure step is of maximum value. If it is of maximum value, processing proceeds to step S156, and if not of maximum value, the exposure step is raised by one step in step S152. Subsequently, in step S156, the data of exposure step is transmitted to the light adjusting circuit 213.

On the other hand, when one-edge of the exposure-down key 116 is made sure in step S153, in step S154, discrimination is made on whether or not the exposure step is of minimum value. If it is of minimum value, processing proceeds to step S156, and if not of minimum value, the exposure step is lowered by one step in step S155. Subsequently, likewise the above-mentioned, the data of exposure step is transmitted to the amount of light control circuit 213 in step S156.

Figure 13:
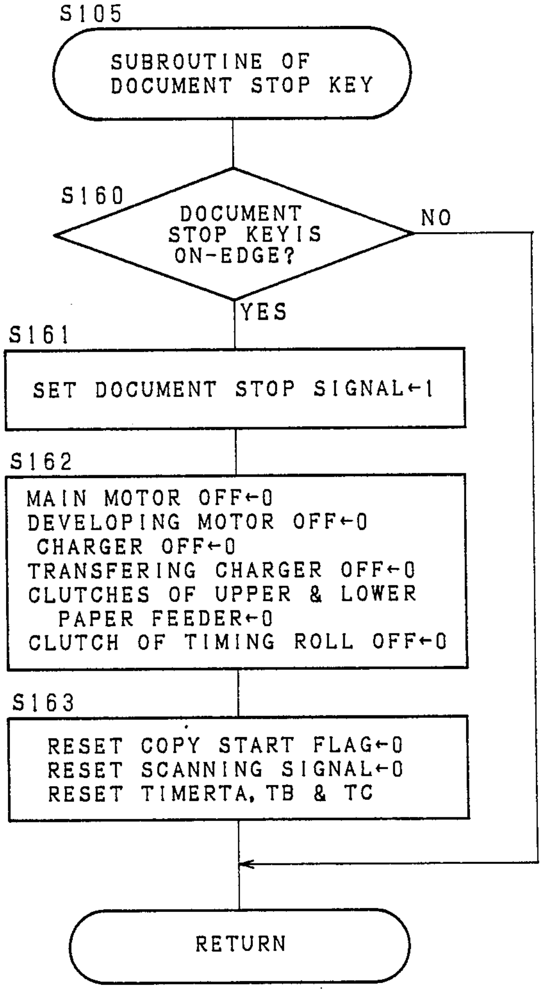

FIG. 13 shows a subroutine processing the document stop key 100 which is executed in step S105.

First, when on-edge of the document stop key 100 is made sure in step S160, the document stop signal is set to "1" in step S161. Subsequently, in step S162, operation of each element of the copying machine main unit 1 is stopped. Simultaneously, in step S163, a copy start flag and a scan signal are reset to "0", and the timers TA, TB and TC are reset.

Figure 14:
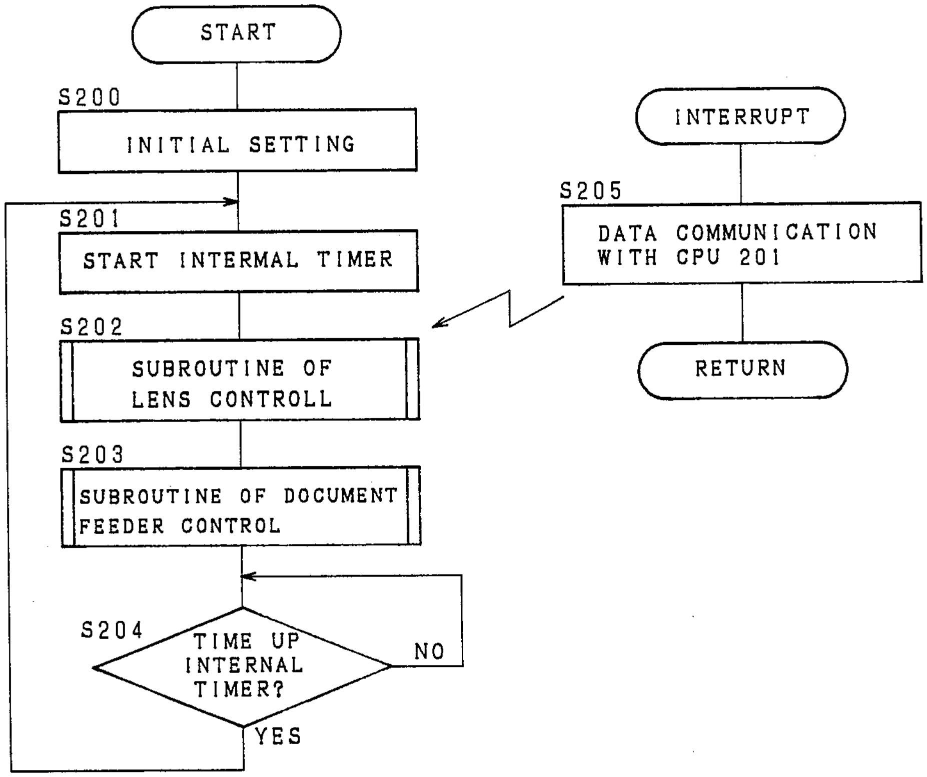

FIG. 14 shows a main routine of the CPU 215 controlling the optical system 20 and the RADF 50.

When a reset is applied to the CPU 215 and a program is started, first, in step S200, initialization of various registers and initialization for putting each apparatus in the initial mode are performed. Subsequently, in step S201, the internal time of the CPU 215 is started. This internal timer determines the time required for one routine of this main routine, and the value thereof is set in advance in step S200.

Next, each subroutine shown in steps S202 and S203 is called in sequence, and processing of all the subroutines is completed, and processing waits until the completion of the above-mentioned internal timer in step S204, and returns to step S201. Using this time length of one routine, counting of various timers working in each subroutine is performed. This means that the values of various timers decide the end of counting by the number of times of repetition of this one routine.

Also, when an interrupt request is made from the CPU 201 during execution of various processings, data communication with the CPU 201 is performed in step S205.

Figure 15:
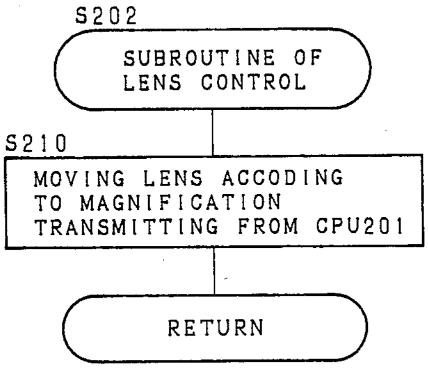

FIG. 15 shows a subroutine of lens control executed in step S202 of the main routine, and in step S210, the motor M2 is controlled according to the copy magnification transmitted from the CPU 201 to move the lens 25 and the mirror 26.

Figure 16A:
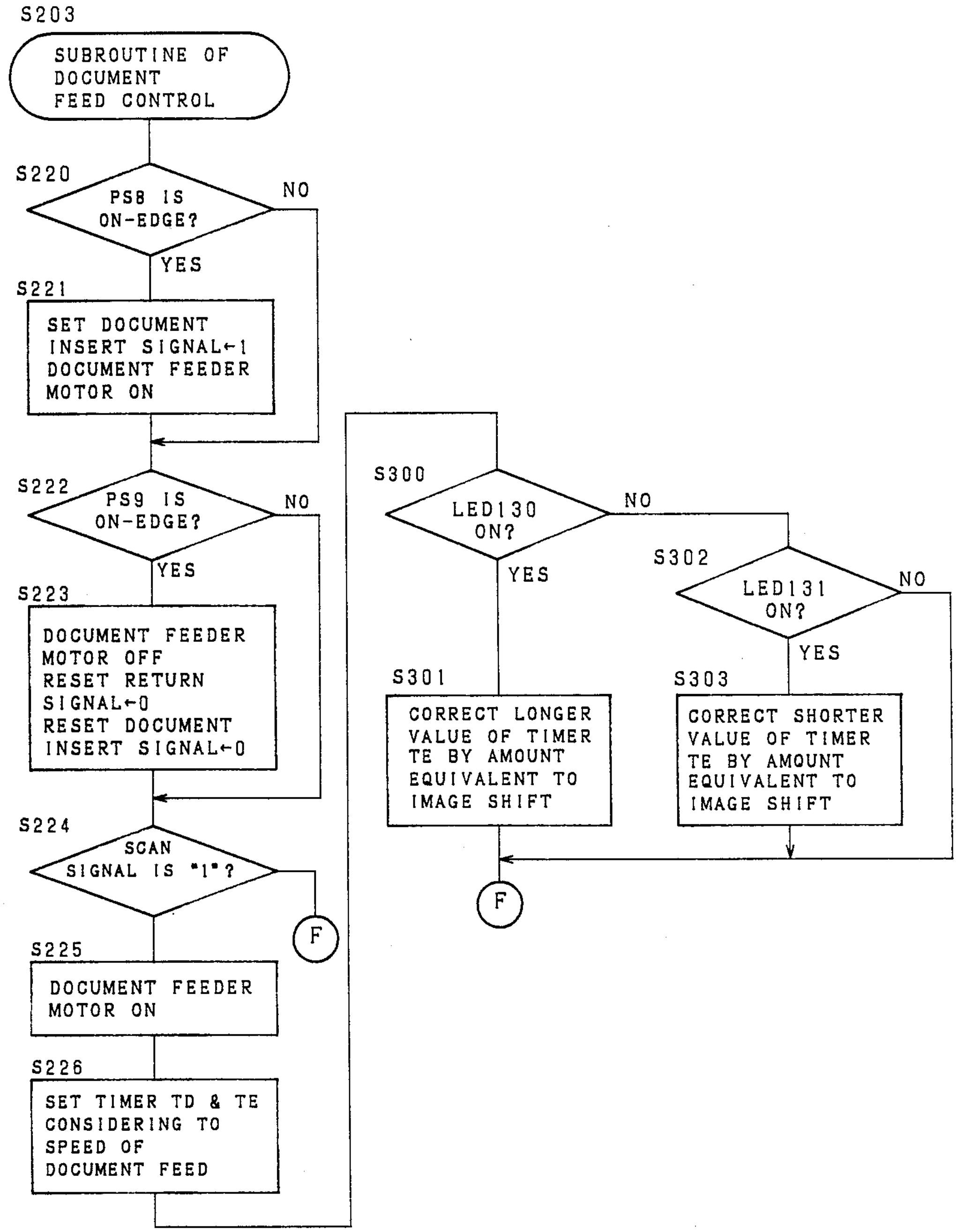
Figure 16B:
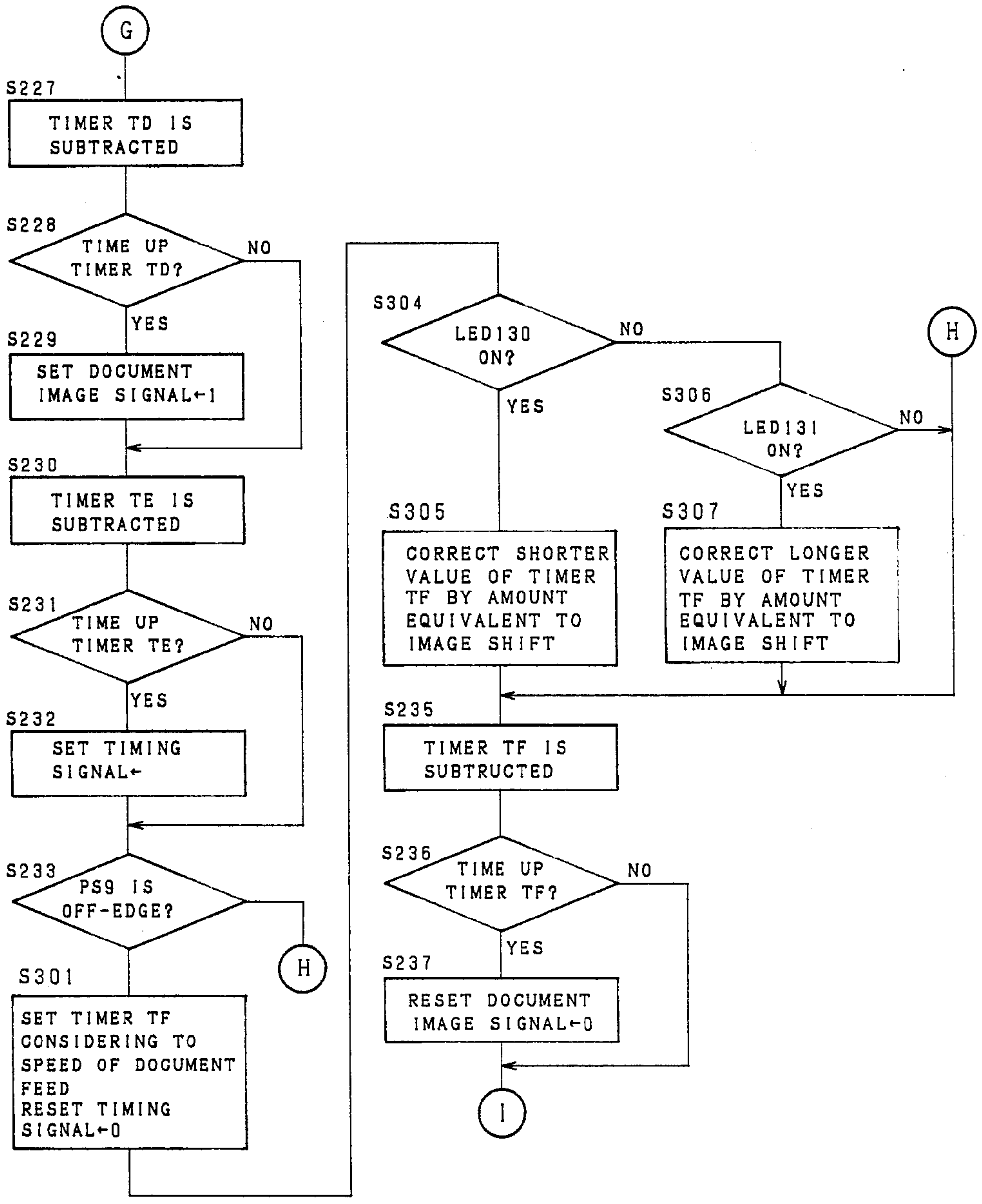
Figure 16C:
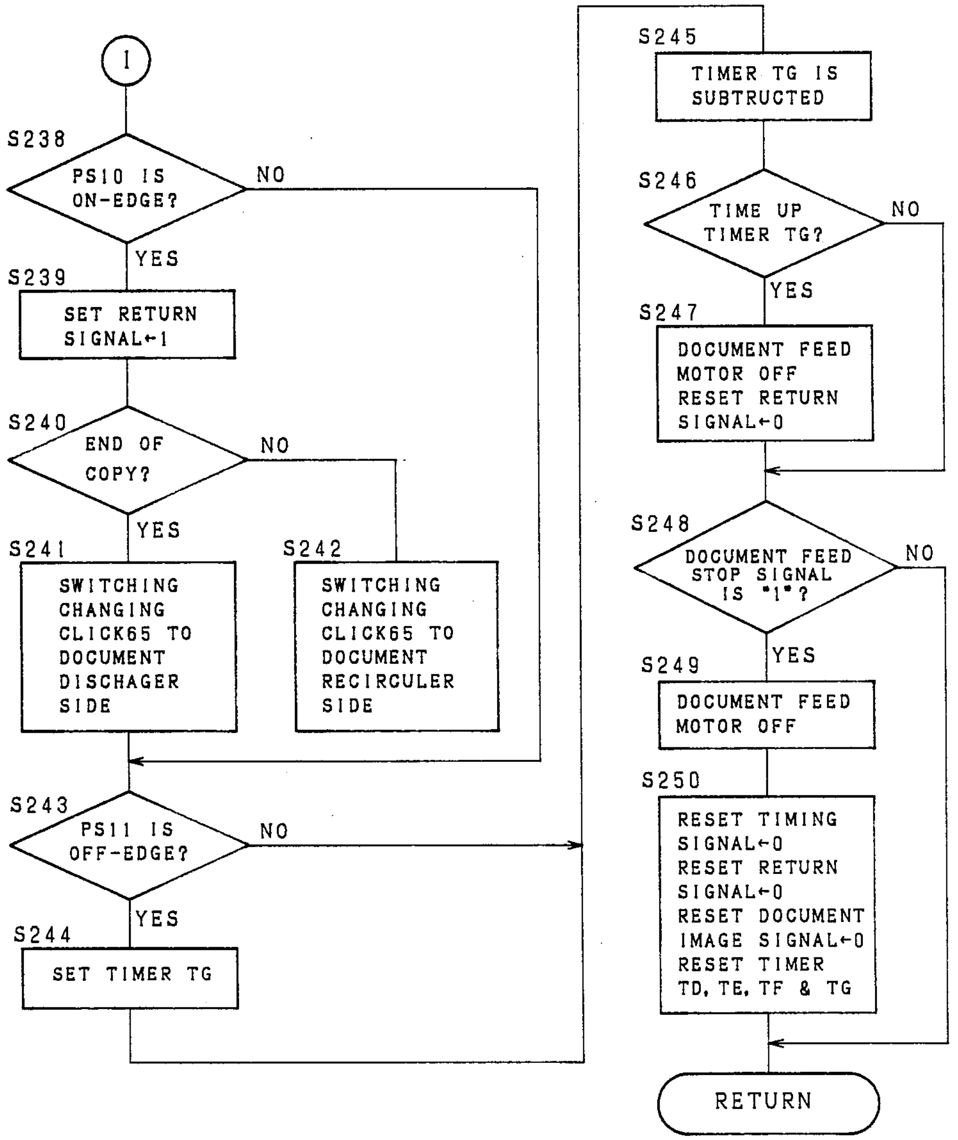

FIG. 16*a*, FIG. 16*b* and FIG. 16*c* show subroutines of document feed control executed in step S203 of the main routine.

First, when on-edge of the sensor PS8 is discriminated in step S220, a document insert signal is set to "1", and the document feed motor M3 is turned on in step S221. Thus, the document is fed in the RADF 50. Subsequently, in step S222, on-edge of the sensor PS9 is discriminated. If it is onedge, that is, if the front end of the document reaches the sensor PS9, in step S223, the document feed motor M3 is turned off, and the return signal and the document insert signal are reset to "0".

Next, in step S224, discrimination is made on whether or not the scan signal is "1", and if it is "1", (refer to step S20), in step S225, the document feed motor M3 is turned on. In this case, the motor M3 is controlled to have a speed corresponding to the copy magnification, and the document is fed from the position of the sensor PS9. Simultaneously, in step S226, timers TD and TE are set. The timer TD is set to the time required for the front end of the document to reach the position of light irradiation on the glass 27 from the sensor PS9 taking the document feeding speed corresponding to the copy magnification into consideration. Also, the timer TE is set to the time when timing of turning on the timing rollers 40 is generated taking the document feeding speed corresponding to the copy magnification into consideration likewise. On the other hand, if the scan signal is "0", processing proceeds to step S227.

Next, in steps S300 and S302, discrimination is made on whether or not the image shift select displaying LED 130 or 131 is turned on. if the LED 130 is turned on, the forward image shift mode is selected, and therefore in step S301, the value of the timer TE is extended by an amount equivalent to the shift so that the timing signal is outputted later than normal. Also, if the LED 131 is turned on, the backward image shift mode is selected, and therefore in step S303, the value of the time TE is shortened by an amount equivalent to the shift so that the timing signal is outputted earlier than normal.

Next, in step S227, the timer TD is subtracted, and in step 228, discrimination is made on whether or not counting of the timer TD has been completed. When counting of the timer TD is completed, that is, the front end of the document reaches the position of light irradiation, in step S229, the document image signal is set to "1". Subsequently, in step S230, the timer TE is subtracted, and when the end of counting of the timer TE is made sure in step S231, the timing signal is set to "1" in step S232.

Next, in step S233, off-edge of the sensor PS9 is discriminated. If it is off-edge, in step S234, a timer TF is set, and the timing signal is reset to "0". The timer TF is set to the time required for the rear end of the document to pass through the position of light irradiation from the sensor PS9 taking the document feeding speed corresponding to the copy magnification into consideration. On the other hand, if the sensor PS9 is not off-edge, processing proceeds to step S235.

Next, in steps S304 and S306, discrimination is made on whether or not the image shift select displaying LED 130 or 131 is turned on. When the LED 130 is turned on, the forward image shift mode is selected, and the feed of the roll paper is started at a timing earlier than normal, and therefore responsively, in step S305, the timer TF is set to a value shorter than normal by an amount equivalent to the shift, and the document image signal is outputted earlier. At this time, as described in the above-mentioned step **S41*d*, the timer T1 is also set to a shorter value, and therefore the discrimination of the size to be cut does not differ from normal. Also, when the LED 131 is turned on, the backward image mode is selected, and the feed of the roll paper is started at a timing later than normal, and therefore responsively, in step S307, the timer TF is set to a value longer than normal by an amount equivalent to the shift. At this time also, likewise the above-mentioned, in step S41*b*, the timer T1 is also set to a longer value, and therefore the discrimination of the size to be cut does not differ from normal. Subsequently, in step S235, the timer TF is subtracted, and when the end of counting of the timer TF is made sure in step S236, the document image signal is reset to "0" in step S237**.

Next, in step S238, on-edge of the sensor PS10 is discriminated. If it is on-edge, in step S239, a return signal is set to "1", and in step S240, discrimination is made on whether or not copying has ended. If copying has ended, in step S241, the document is discharged with the change-over click 65 turned off intact. On the other hand, if copying has not ended, in step S242, processing is changed over to document circulation by turning-on the change-over click 65.

Next, in step S243, off-edge of the sensor PS11 is discriminated. If it is off-edge, in step S244, a timer TG is set. The timer TG is set to the time required for the rear end of the document to be discharged onto the copy receiving tray 60 from its passing through the sensor PS11. Accordingly, in step S245, the timer TG is subtracted, and when the end of counting of the timer TG is made sure in step S246, in step S247, the document feed motor M3 is turned off, and the return signal is reset to "0".

On the other hand, in step S248, discrimination is made on whether or not the document stop signal is "1", and if it is "1"0 [refer to step S161], the document feed motor M3 is turned off in step S249. Simultaneously, in step S250, the timing signal, the return signal, the document image signal are reset to "0", the timers TD, TE, TF and TG are reset, and the control of the RADF 50 is stopped.

In addition, the present invention is not limited to the above-mentioned embodiment, being able to be modified variously within the scope of the essential characteristics thereof.

Specifically, as to the scanning system of the document, a system moving the document sequentially one by one, a system reciprocatively moving the document table, or a system reciprocatively moving the optical system with the document table fixed can be employed other than the RADF circularly moving the document.

Also, in the image shift mode, in the above-mentioned embodiment, to adjust the length to be cut of the roll paper to the fixed size, the set value of the timer T1 is corrected corresponding to the amount of image shift, but a timer means corresponding to the amount of image shift can be installed separately.

As obvious from the above description, in accordance with the present invention, in normal copying, the roll paper is cut on the basis of the cut signal from the size discriminating means which discriminates the length to be cut of the roll paper according to the image length determined by the document feeding direction and the selected copy magnification, and the width of the roll paper, and therefore the length to be cut of the roll paper can be automatically discriminated either the lateral fixed size or the longitudinal fixed size by the size discriminating means, and the operator needs not to input the length to be cut one by one to the apparatus, and an occurrence of wrong input can be prevented, and the use convenience can be improved. Also, in forming the image while shifting it, the roll paper is cut on the basis of the cut signal from the shift correction discriminating means which discriminates the length to be cut of the roll paper corresponding to the amount of image shift, and therefore the size to be cut does not deviate even in copying the image while shifting it, and thereby the roll paper can be cut accurately in the fixed size.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the meets and bounds of the claims, or equivalence of such meets and bounds thereof are therefore intended to be embraced by the claims.

What is claimed is:

1. An image forming apparatus comprising:

an image forming means having a photosensitive member for forming a latent image of an image of a document, and a developing means for developing said latent image;

an optical means having a projecting means for projecting said image onto said photosensitive member, and a magnification varying means for varying the projection magnification of said image to be projected;

a scanning means for relatively moving said document and said optical means at a speed corresponding to said projection magnification;

a paper feeding means for feeding roll paper to said image forming means;

a cutting means for cutting said roll paper to one of a first fixed length and a second fixed length which is double said first length;

an image signal generating means for generating an image length signal on the basis of the length of said document in the direction of its relative movement and the projection magnification;

a paper width detecting means for detecting the width size of said roll paper; and a cut controlling means for controlling said cutting means in order to cut said roll paper to one of the first fixed length and the second fixed length in response to the width of said roll paper and said image signal.

2. An image forming apparatus as set forth in claim 1, wherein:

said signal generating means comprises a document detecting means for detecting said document in relative movement, and outputs said image length signal corresponding to said document detecting means; and said cut controlling means comprises a timer means having a time limited value corresponding to the width of said roll paper and starting in response to said image length signal, a size discriminating means for discriminating the document size corresponding to the state of said image length signal at the time-up of said timer means, and a cut signal generating means for outputting one of a first signal for cutting said roll paper to the first fixed length and a second signal for cutting said roll paper to the second fixed length in response to said discriminated document size and the width of said roll paper.

3. An image forming apparatus as set forth in claim 2, further comprising a timing signal generating means for generating a timing signal which controls the timing of feeding said roll paper from said paper feeding means to said image forming means, and said cut signal generating means starting a first timer or a second timer on the basis of said document size and said width of said roll paper in response to said timing signal, and outputting the first signal at the time-up of the first timer and outputting the second signal at the time-up of the second timer.

4. An image forming apparatus as set forth in claim 1, further comprising:

a timing signal generating means for generating a timing signal which controls timing of feeding said roll paper from said paper feeding means to said image forming means, and said cut controlling means having a first timer means being set to a length corresponding to the width of said roll paper detected by said paper width detecting means and starting in response to said image signal, a cut discriminating means for interpreting the state of said image signal at the time-up of said first timer means and discriminating between said first fixed length and said second fixed length to which said roll paper is to be cut, a second time means for said first fixed length and said second fixed length being set corresponding to the result of discrimination by said cut discriminating means and the detected width of said roll paper, a third timer means being set to a length corresponding to said first fixed length when said timing signal is generating before completion of discrimination by said cut discriminating means, and a fourth timer means being set so as to correct said third timer to correspond to the second fixed length when discrimination is made to cut by the second length by said cut discriminating means after said third timer means has been set, and outputting the first signal corresponding to the first length and the second signal corresponding to the second length to which said roll paper is to be cut at the timeup of said second, third and fourth timer means.

5. An image forming apparatus as set forth in claim 1, further comprising:

a timing signal generating means for generating a timing signal which controls timing of feeding said roll paper from said paper feeding means to said image forming means, and said cut controlling means comprising:

a first timer means being set to a length corresponding to the width of said roll paper detected by said paper width detecting means and starting in response to said image length signal, a cut discriminating means for discriminating one of said first fixed length and said second fixed length to which said roll paper is to be cut after discriminating the state of said image length signal at the timeup of said first timer, a second timer means for said first fixed length and said second fixed length being set corresponding to the result of discrimination by said cut discriminating means and the detected width of said roll paper, a first cut signal generating means for generating a cut signal in order to cut said roll paper at time-up of said second timer, a third timer means for correction being set to a length corresponding to said second fixed length when discrimination by said cut discriminating means has not been completed at the time-up of said second timer for said fixed first length, and a second cut signal generating means inhibiting operation of said first cut signal generating means when said third timer means is set, and generating a cut signal to cut said roll paper at the time-up of said third timer.

6. In an image forming apparatus which feeds a roll paper loaded in a paper feeder to an image forming means for forming an image of a document, and forms an image of a document on said roll paper, said image forming apparatus comprising:

a detecting means for detecting the width of a roll paper loaded in said paper feeder;

an image signal generating means for generating an image signal designating the image length being set by the length of said document in the image scanning direction and the selected copy magnification;

a timing signal generating means for generating a timing signal for feeding said roll paper to said image forming means;

an image shifting means for shifting the image position on said roll paper back and forth in the feeding direction of said roll paper by making generation of said timing signal vary from that in normal state by a predetermined amount of shift;

a cut discriminating means for discriminating one of a first fixed length and a second fixed length being double thereof to which said roll paper is to be cut by the width of said roll paper detected by said detecting means, said image signal and a predetermined amount of shift of said timing signal by said image shifting means; and a cutting means for cutting said roll paper on the basis of the result of discrimination by said cut discriminating means.

7. An image forming apparatus comprising:

an image forming means having a photosensitive member for forming a latent image of an image of a document, and a developing means for developing said latent image;

an optical means having a projecting means for projecting said image onto said photosensitive member, and a magnification varying means for varying the projections magnification of said image to be projected;

a scanning means for relatively moving said document and said optical means at a speed corresponding to said projections magnification;

a first detecting means for detecting said document in relative movement;

a paper feeding means for feeding a roll paper to said image forming means;

a second detecting means for detecting the width of said roll paper;

a cutting means for cutting said roll paper to one of a first fixed length and a second fixed length longer than the first fixed length;

a timer means starting in response to said first detecting means and having a time limit value corresponding to the width of said roll paper; and a cut controlling means for controlling said cutting means to cut said roll paper to one of said first fixed length and said second fixed length corresponding to the state of said first detecting means at the time-up of said timer means.

8. An image forming apparatus comprising:

an image forming means having a photosensitive member forming a latent image of an image of a document and a developing means for developing said latent image;

an optical means for projecting said image onto said photosensitive member;

a scanning means for relatively moving said document and said optical means;

a document size detecting means for detecting the document size;

a paper feeding means for feeding a roll paper to said image forming means;

a cutting means for cutting said roll paper to one of a first fixed length and a second fixed length longer than the first fixed length;

a first controlling means for controlling said cutting means in order to cut said roll paper to one of said first fixed length and said second fixed length corresponding to the document size detected by said document size detecting means; and a second controlling means for controlling said cutting means in order to cut said roll paper to said second fixed length when said document size detecting means fails to detect the document size.

9. An image forming apparatus comprising:

an image forming means having a photosensitive member for forming a latent image of an image of a document, and a developing means for developing said latent image;

an optical means having a projecting means for projecting said image onto said photosensitive member, and a magnification varying means for varying the projection magnification of said image to be projected;

a scanning means for relatively moving said document and said optical means at a speed corresponding to said projection magnification;

a paper feeding means for feeding roll paper to said image forming means;

a cutting means for cutting said roll paper, an image signal generating means for generating an image length signal on the basis of the length of said document in the direction of its relative movement and the projection magnification;

a paper width detecting means for detecting the width size of said roll paper; and a cut controlling means for controlling the operation timing of said cutting in response to the width of said roll paper and said image signal.

* * * * *

UNITED STATES PATENT AND TRADEMARK OFFICE
CERTIFICATE OF CORRECTION

PATENT NO. : 4,891,662

DATED : January 2, 1990

INVENTOR(S) : Takashi Noda

It is certified that error appears in the above-identified patent and that said Letters Patent is hereby corrected as shown below:

The first sheet of drawings should be captioned --Fig. 1--.

The ninth sheet of drawings should be captioned --Fig. 6b--.

Signed and Sealed this

Twelfth Day of May, 1992

*Attest:*

DOUGLAS B. COMER

*Attesting Officer*

*Acting Commissioner of Patents and Trademarks*